(12) United States Patent
Noda et al.

(10) Patent No.: US 7,460,286 B2
(45) Date of Patent: Dec. 2, 2008

(54) METHOD FOR PRODUCING AN OPTICAL DEVICE, OPTICAL DEVICE, IMAGE DISPLAY APPARATUS, AND HEAD-MOUNTED DISPLAY

(75) Inventors: Tetsuya Noda, Tenri (JP); Ichiro Kasai, Toyonaka (JP); Takeshi Endo, Osaka (JP); Yasushi Tanijiri, Osakasayama (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 271 days.

(21) Appl. No.: 11/292,515

(22) Filed: Dec. 2, 2005

(65) Prior Publication Data

US 2006/0120247 A1 Jun. 8, 2006

(30) Foreign Application Priority Data

Dec. 3, 2004 (JP) ............................... 2004-351731
Oct. 18, 2005 (JP) ............................... 2005-302597

(51) Int. Cl.
G03H 1/02 (2006.01)
(52) U.S. Cl. ............................. 359/27; 359/22; 359/32
(58) Field of Classification Search ................... 359/27
See application file for complete search history.

(56) References Cited

U.S. PATENT DOCUMENTS 5,046,793 A * 9/1991 Hockley et al. ............... 359/12

2006/0181682 A1 * 8/2006 Miller .......................... 353/30

FOREIGN PATENT DOCUMENTS

JP 7-160183 A 6/1995
JP 2000-276036 A 10/2000

* cited by examiner

*Primary Examiner*—Fayez G Assaf
(74) *Attorney, Agent, or Firm*—Sidley Austin LLP

(57) ABSTRACT

The exposure amounts of R, G, and B laser light emitted from a fabrication light source are so adjusted that the diffraction efficiency at R, G, and B wavelengths in an optical element is commensurate with the light intensity at the R, G, and B wavelengths in the light emitted from a reproduction light source. For example, when the light intensity of the light emitted from the reproduction light source is increasingly low at the B, G, and R wavelengths in this order, the exposure amounts of the R, G, B, laser light emitted from the fabrication light source are so adjusted that the diffraction efficiency in the optical element is increasingly high at the B, G, and R wavelengths in this order. In this way, the hue of the light (reproduction light) obtained from the reproduction light source via the optical element can be adjusted to the hue desired with every reproduction light source used, while the most use is made of the light emitted from the reproduction light source actually used.

14 Claims, 13 Drawing Sheets

METHOD FOR PRODUCING AN OPTICAL DEVICE, OPTICAL DEVICE, IMAGE DISPLAY APPARATUS, AND HEAD-MOUNTED DISPLAY

This application is based on Japanese Patent Application No. 2004-351731 filed on Dec. 3, 2004 and Japanese Patent Application No. 2005-302597 filed on Oct. 18, 2005, the contents of both of which are hereby incorporated by reference.

BACKGROUND OF THE INVENTION

1. Field of the Invention

The present invention relates to a method for producing an optical device having an optical element formed as a hologram on a transparent base member, to such an optical device, to an image display apparatus employing such an optical device, and to a head-mounted display employing such an image display apparatus.

2. Description of Related Art

When used embedded in a transparent base member, an optical element such as a hologram, half-mirror coat, or beam splitter layer is immune to ambient conditions such as humidity and the presence of oxygen. This makes such an optical element useful as a combiner in, for example, a head-up display or head-mounted display.

In particular, a hologram exhibits high wavelength selectivity and angle selectivity, and is therefore very useful as a combiner as mentioned above. A hologram is formed of a hologram photosensitive material, which typically is a photopolymer, silver-halide-based material, or gelatin bichromate. Among these materials, photopolymers, unlike silver-halide-based materials or gelatin bichromate, permit easy production by a dry process, and are sensitive over the entire range of visible light. Thus, photopolymers find wide application as hologram photosensitive materials.

Methods for fabricating a color hologram wherein a photopolymer is used as a hologram photosensitive material are disclosed, for example, Japanese Patent Application Laid-open No. H7-160183 (hereinafter Patent Publication 1) and Japanese Patent Application Laid-open No. 2000-276036 (hereinafter Patent Publication 2).

According to Patent Publication 1, the amounts of exposure to R, G, and B light are adjusted according to the exposure sensitivity of the hologram photosensitive material so as to obtain diffraction efficiency that produces a desired hue. According to Patent Publication 2, one or more of the peak wavelength, the peak height (diffraction efficiency), and the full-width-at-half-maximum of the diffraction efficiency of the hologram are so controlled as to prevent degraded reproduction of the white color.

When a fabricated color hologram is irradiated with light from a reproduction light source, it produces light called reproduction light. The hue (color balance) of the reproduction light of a color hologram and the brightness of the image conveyed by the reproduction light need to be adjusted with consideration given not only to the wavelength (diffraction wavelength) and the efficiency at which the color hologram diffracts light but also to the intensity of the light emitted from the reproduction light source at different wavelengths (for examples, at R, G, and B wavelengths). This is because what type of light source is used as the reproduction light source (at what intensity the reproduction light source emits light at different wavelengths) affects the hue of the production light and the brightness of the image. Accordingly, even when diffraction efficiency is so adjusted that the reproduction light is white, if no consideration is given to the intensity at which the reproduction light source emits light at different wavelengths, the reproduction light may be other than white depending on the reproduction light source actually used. With this, therefore, it cannot be said that the hue of the reproduction light is adjusted to be quite white.

From the above perspective, Patent Publications 1 and 2 mentioned above are no exception, according to which the diffraction efficiency and the amount of exposure of the hologram are adjusted with no consideration given to the intensity at which the reproduction light source emits light at different wavelengths, and thus the hue of the reproduction light and the brightness of the image vary depending on the reproduction light source actually used. That is, inconveniently, it is impossible to obtain, with every reproduction light source used, a bright image with a good color balance.

SUMMARY OF THE INVENTION

In view of the conventionally experienced inconveniences discussed above, it is an object of the present invention to provide a method for producing an optical device that produces a bright image with a good color balance with every reproduction light source used, to provide such an optical device, to provide an image display apparatus incorporating such an optical device, and to provide a head-mounted display incorporating such an image display apparatus.

To achieve the above object, according to one aspect of the present invention, a method for producing an optical device includes: a bonding step of bonding a hologram photosensitive material on a transparent base member; and an exposing step of exposing the hologram photosensitive material to laser light of a plurality of different wavelengths from a fabrication light source in order to form on the transparent base member a hologram optical element having diffraction efficiency peaks at a plurality of diffraction peak wavelengths corresponding to the plurality of different wavelengths. Here, the exposing step includes a step of adjusting the exposure amounts of laser light of the different wavelengths from the fabrication light source in such a way that the diffraction efficiency of the hologram optical element at the individual diffraction peak wavelengths during reproduction is commensurate with the light intensity at the individual diffraction peak wavelengths in the light from a reproduction light source.

To achieve the above object, according to another aspect of the present invention, an optical device includes: a transparent base member; and an optical element formed as a hologram on the transparent base member. Here, the optical element is formed on the transparent base member by exposing a hologram photosensitive material bonded on the transparent base member to light of a plurality of wavelengths from a fabrication light source so that the optical element has diffraction efficiency peaks at a plurality of diffraction peak wavelengths corresponding to the plurality of different wavelengths. Moreover, the exposure amounts of laser light of the different wavelengths from the fabrication light source are adjusted in such a way that the diffraction efficiency of the hologram optical element at the individual diffraction peak wavelengths during reproduction is commensurate with the light intensity at the individual diffraction peak wavelengths in the light from a reproduction light source, and the optical element is formed by being exposed to the so adjusted exposure amounts of laser light.

With the design described above, the exposure amounts of laser light of different wavelengths (for examples, $R_2$, $G_2$, and $B_2$) from the fabrication light source are adjusted in such a way that the diffraction efficiency at the individual diffraction peak wavelengths (for example, $R_1$, $G_1$, and $B_1$) in the hologram optical element is commensurate with the light intensity at the individual diffraction peak wavelengths (for example, $R_1$, $G_1$, and $B_1$) in the light emitted from the reproduction light source. For example, when the intensity of the light from the reproduction light source is increasingly low at the $B_1$, $G_1$, and $R_1$ wavelengths in this order, the exposure amounts of $R_2$, $G_2$, and $B_2$ laser light from the fabrication light source are so adjusted that the diffraction efficiency in the optical element is increasingly high at the $B_1$, $G_1$, and $R_1$ wavelengths in this order.

In this way, consideration is given to the light intensity at the individual diffraction peak wavelengths of the light from the reproduction light source actually used, and the exposure amounts of laser light at the different wavelengths are so adjusted as to obtain diffraction efficiency commensurate with the light intensity. Then, with the so adjusted exposure amounts, the optical element is formed on the transparent base member. This makes it possible to adjust the hue of the light (reproduction light) obtained from the reproduction light source via the optical element to the one desired with every reproduction light source used, while the most use is made of the light emitted from the reproduction light source actually used. Thus, it is possible to obtain, with every reproduction light source used, a bright image with a good color balance.

According to another aspect of the present invention, a method for producing an optical device includes: a bonding step of bonding a hologram photosensitive material on a transparent base member; and an exposing step of exposing the hologram photosensitive material to laser light of a plurality of different wavelengths from a fabrication light source in order to form on the transparent base member a hologram optical element having diffraction efficiency peaks at a plurality of diffraction peak wavelengths corresponding to the plurality of different wavelengths. Here, the exposing step includes a step of adjusting the exposure amounts of laser light of the different wavelengths from the fabrication light source in such a way that, when a plurality of illumination light sources corresponding to the individual diffraction peak wavelengths are used as a reproduction light source during reproduction, the diffraction efficiency at the diffraction peak wavelength corresponding to, of the plurality of illumination light sources, the illumination light source that consumes the least electric power when fed with a given amount of current is lower than the diffraction efficiency at the other diffraction peak wavelengths.

According to another aspect of the present invention, an optical device includes: a transparent base member; and an optical element formed as a hologram on the transparent base member. Here, the optical element is formed on the transparent base member by exposing a hologram photosensitive material bonded on the transparent base member to light of a plurality of wavelengths from a fabrication light source so that the optical element has diffraction efficiency peaks at a plurality of diffraction peak wavelengths corresponding to the plurality of different wavelengths. Moreover, the exposure amounts of laser light of the different wavelengths from the fabrication light source are adjusted in such a way that, when a plurality of illumination light sources corresponding to the individual diffraction peak wavelengths are used as a reproduction light source during reproduction, the diffraction efficiency at the diffraction peak wavelength corresponding to, of the plurality of illumination light sources, the illumination light source that consumes the least electric power when fed with a given amount of current is lower than the diffraction efficiency at the other diffraction peak wavelengths, and the optical element is formed by being exposed to the so adjusted exposure amounts of laser light.

For example, when the power consumption of a plurality of illumination light sources (R, G, and B) corresponding to the individual diffraction peak wavelengths ($R_1$, $G_1$, and $B_1$) when fed with a given amount of current is increasingly low with B, G, and R in this order, the exposure amounts of $R_2$, $G_2$, and $B_2$ laser light from the fabrication light source are so adjusted that the diffraction efficiency at the diffraction peak wavelength $R_1$ corresponding to the R illumination light source, which consumes the least electric power, is lower than the diffraction efficiency at the other, namely $G_1$ and $B_1$, diffraction peak wavelengths.

In general, the amounts (brightness) of light emitted from the individual illumination light sources increase as the amounts of current fed thereto are increased. However, in a case where an upper limit is set on the sum of the power consumption of the R, G, and B illumination light sources, each of them cannot be fed with the maximum amount of current that they are rated to consume. This may lead to light shortage.

By contrast, with the design described above, for example, the diffraction efficiency at the diffraction peak wavelengths $G_1$ and $B_1$ corresponding to the G and B illumination light sources, which consume more electric power than the R illumination light source, is set to be higher than at the diffraction peak wavelength $R_1$. This makes it possible, without reducing the amounts of R, G, and B light ultimately obtained, to reduce the amounts of current fed to the G and B illumination light sources and thereby reduce their power consumption. That is, it is possible to obtain the same brightness while saving electric power.

Moreover, since the diffraction efficiency at the diffraction peak wavelength $R_1$ corresponding to the R illumination light source, which consumes the least electric power, is set to be lower than at the other diffraction peak wavelengths $G_1$ and $B_1$, it is possible to increase the amount of current fed to the R illumination light source and thereby increase the amount of light emitted therefrom within the range of the prescribed sum of power consumption. Incidentally, when fed with a given current, the R illumination light source consumes the least electric power, and therefore the rate (variation rate) at which power consumption increases in response to an increase in current is the lowest with the R illumination light source. This makes it possible to obtain bright light while saving power as much as possible.

Moreover, when the amounts of current fed to the individual illumination light sources are adjusted as described above, by adjusting the amounts of current and thereby adjusting the R, G, and B light intensity so that the reproduction light is, for example, white, it is possible to obtain a bright image with a good color balance with every reproduction light source used.

That is, with the design described above, it is possible not simply to obtain, with every reproduction light source used, a bright image with a good color balance but simultaneously to achieve power saving in the reproduction light source.

According to the present invention, an image display apparatus includes: an optical device according to the present invention as described previously; and an image display element that displays an image to feed it to the optical device. With this design, the observer can simultaneously observe, via the optical device, the image fed from the image display element and, also via the optical device but here on a see-through basis, the outside-world image.

According to the present invention, a head-mounted display includes: an image display apparatus as described just above; and a supporter that supports the image display apparatus before an observer's eye. With this design, the image display apparatus is supported before the observer's eye by the supporter, and thus the observer can observe, with his or her hands free, the outside-world image and the image displayed on the image display element.

BRIEF DESCRIPTION OF THE DRAWINGS

The above and other objects and features of the present invention will become clear through the following description of preferred embodiments taken in conjunction with the accompanying drawings, in which.

DETAILED DESCRIPTION OF PREFERRED EMBODIMENTS

Hereinafter, an embodiment of the present invention will be described with reference to the drawings.

1. Head-Mounted Display

Figure 2A:
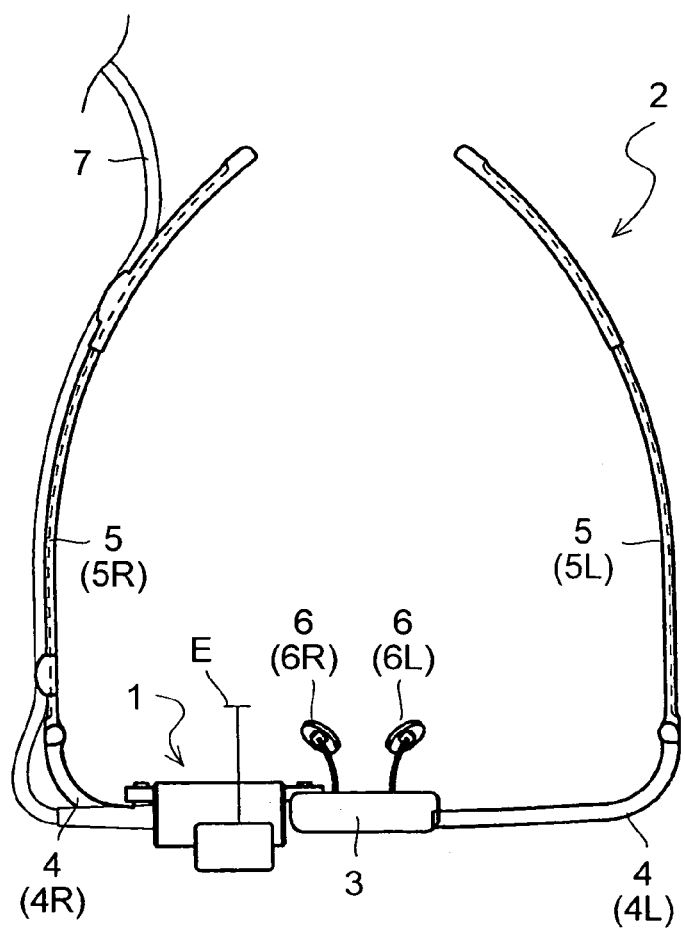
FIG. 2A is a plan view showing an outline of the structure of the above head-mounted display.
Figure 2B:
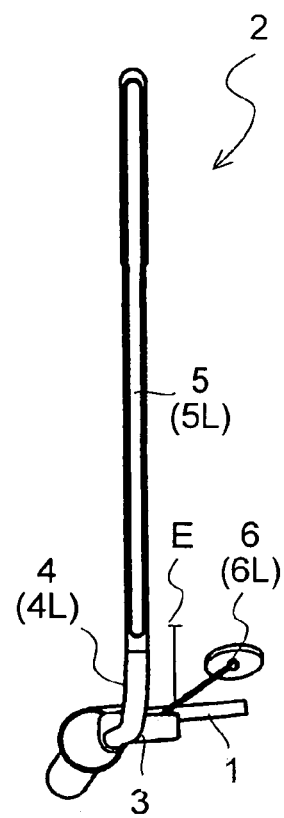
FIG. 2B is a side view of the above head-mounted display.
Figure 2C:
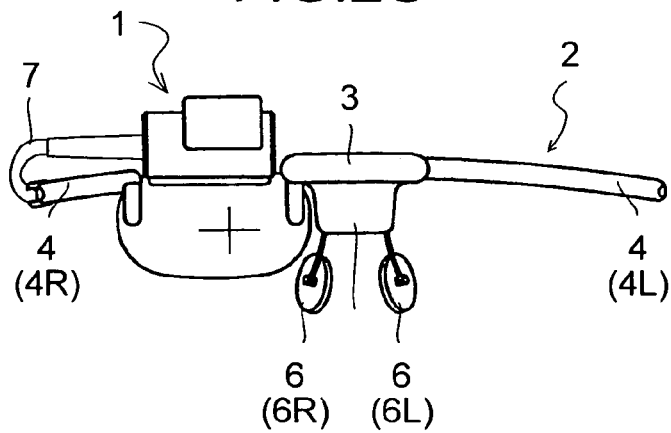
FIG. 2C is a front view of the above head-mounted display.

FIG. 2A is a plan view showing an outline of the structure of a head-mounted display (hereinafter abbreviated to "HMD") embodying the invention, FIG. 2B is a side view of the same HMD, and FIG. 2C is a front view of the same HMD. The HMD includes an image display apparatus 1 and a supporter 2 that supports it, and has an appearance like that of common eyeglasses of which one of the lenses (for example, the left-eye lens) has been removed.

The image display apparatus 1 permits an observer to observe the outside-world image in a see-through fashion, and simultaneously displays an image to feed it, as a virtual image, to the observer. In the image display apparatus 1 shown in FIG. 2C, the part thereof that corresponds to the right-eye lens of eyeglasses is composed of two transparent base members 22 and 23 (see FIG. 4), which will be described later, that are bonded together. The structure of the image display apparatus 1 will be described in detail later.

The supporter 2 supports the image display apparatus 1 before the observer's eye (for example, the right eye), and includes a bridge 3, frames 4, temples 5, nose pads 6, and a cable 7. The frames 4, the temples 5, and the nose pads 6 are provided in pairs each including a left one and a right one and, wherever distinction is necessary, they are referred to as the right frame 4R, the left frame 4L, the right temple 5R, the left temple 5L, the right nose pad 6R, and the left nose pad 6L.

One end of the image display apparatus 1 is supported on the bridge 3. This bridge 3 supports, in addition to the image display apparatus 1, the left frame 4L and the nose pads 6. The left frame 4L pivotably supports the left temple 5L. The other end of the image display apparatus 1 is supported on the right frame 4R. The right frame 4R, at the end thereof opposite to where it supports the image display apparatus 1, pivotably supports the right temple 5R. The cable 7 contains conductors via which external signals (for example, image and control signals) and electric power are fed to the image display apparatus 1, and is laid along the right frame 4R and the right temple 5R.

When an observer uses the HMD, the observer wears it on the head as if to wear common eyeglasses, with the right and left temples 5R and 5L kept in contact with the right and left side parts of the head and the nose pads 6 on the nose. In this state, when the image display apparatus 1 displays an image, the observer can observe, as a virtual image, the image displayed by the image display apparatus 1, and can simultaneously observe the outside-world image in a see-through fashion via the image display apparatus 1.

Figure 3A:
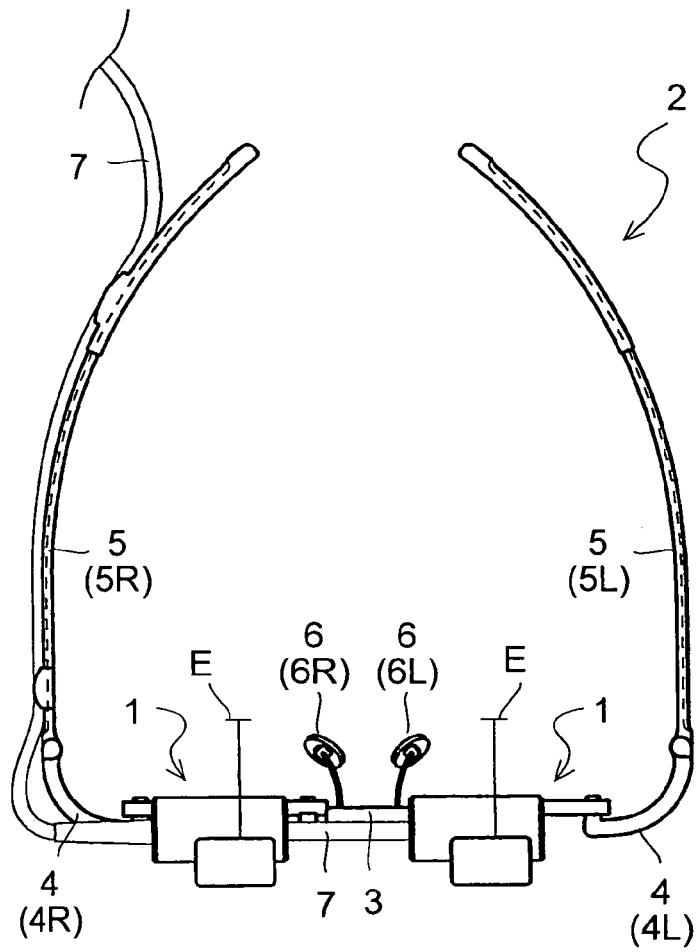
FIG. 3A is a plan view showing another structure of the above head-mounted display.
Figure 3B:
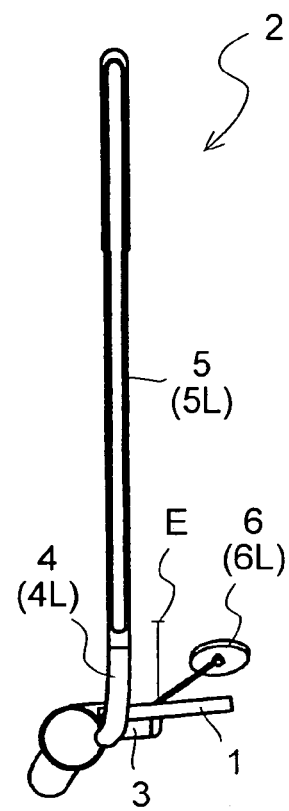
FIG. 3B is a side view of the above head-mounted display.
Figure 3C:
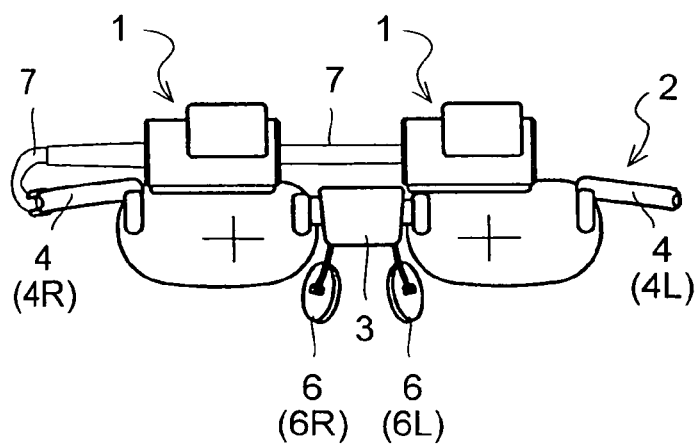
FIG. 3C is a front view of the above head-mounted display.

The HMD may be designed otherwise than to include only one image display apparatus 1. For example, FIG. 3A is a plan view showing another example of the structure of the HMD, FIG. 3B is a side view of the same HMD, and FIG. 3C is a front view of the same HMD. As shown in these diagrams, the HMD may have two image display apparatuses 1 arranged one before each eye of an observer. In this case, the image display apparatus 1 arranged before the left eye is supported on the bridge 3 and the left frame 4L in a space secured between them. Moreover, the cable 7 is connected to both the image display apparatuses 1 so that they are both fed with external signals and the like via the cable 7.

2. Image Display Apparatus

Figure 4:
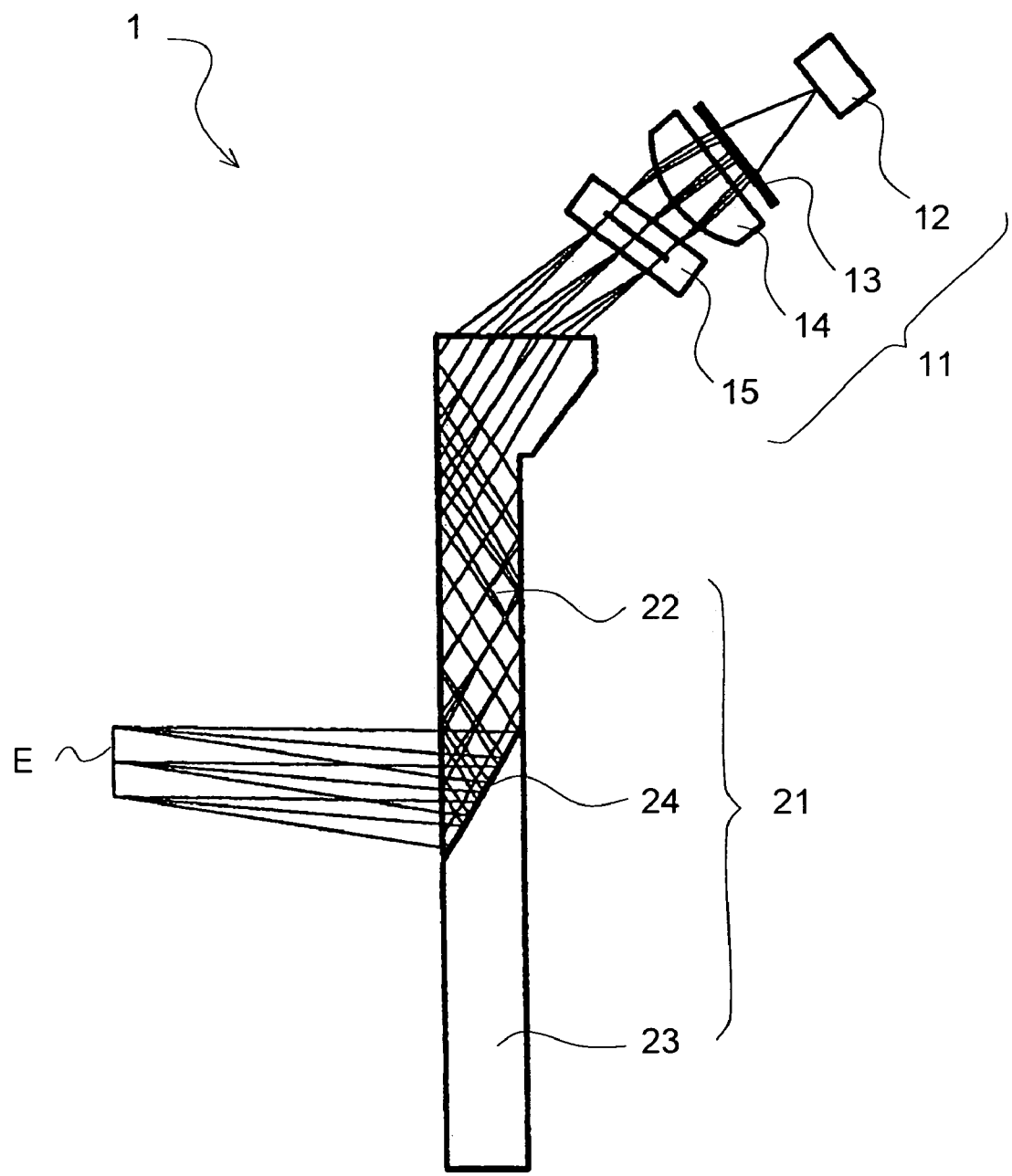
FIG. 4 is a sectional view showing an outline of the structure of the above image display apparatus.

Next, the image display apparatus 1 mentioned above will be described in detail. FIG. 4 is a sectional view showing an outline of the structure of the image display apparatus 1. The image display apparatus 1 is composed of an image display element 11 and an eyepiece optical system 21.

The image display element 11 includes a light source 12, a one-directional diffuser plate 13, a condenser lens 14, and an LCD 15. Here, the light source 12, the one-directional diffuser plate 13, and the condenser lens 14 together form an illumination optical system for illuminating the LCD 15.

The light source 12 is built with an LED (light-emitting diode) that emits light in three wavelength bands whose center wavelengths are, for example, 465 nm, 520 nm, and 635 nm. An LED offers advantages of being compact, lightweight, inexpensive, and power-saving, and is therefore particularly effective for use in a HMD like that of this embodiment.

Color display can be achieved with a white LED built with "a blue LED combined with a yellow fluorescent member" or "an ultraviolet LED combined with an RGB fluorescent member", or a combination of three independent three-color, namely R, G, and B, LEDs (including a three-color-in-one-chip type). Among these, the type mentioned last is preferable. The reflective hologram that is used as an optical element 24, which will be described later, in the eyepiece optical system 21 exhibits high wavelength selectivity and requires light in a narrow wavelength range for reproduction. Thus, independent three-color, namely R, G, and B, LEDs exhibit better wavelength matching with the hologram, and offers higher light use efficiency. It should be noted that "reproduction" means using the optical element 24 produced by the later described procedure in one of various devices, and thus refers to a concept different from "fabrication", which means fabricating the optical element 24 itself. Moreover, little light of wavelengths unnecessary for reproduction is involved, and therefore it is possible to obtain image quality with little noise light such as ghosts and flare. Furthermore, the full widths at half maximum of the R, G, and B diffracted light from the optical element 24 are all small, and thus it is possible to achieve good color reproduction in the displayed image (obtain a wide color reproduction range).

The one-directional diffuser plate 13 diffuses the illumination light from the light source 12 with varying degrees of diffusion in different directions. More specifically, the one-directional diffuser plate 13 diffuses the light incident thereon at about 40 degrees in the direction corresponding to the left/right direction with respect to the observer wearing the HMD (that is, in the direction perpendicular to the plane of FIG. 4) and at about 2 degrees in the direction corresponding to the up/down direction with respect to the observer wearing the HMD (that is, in the direction parallel to the plane of FIG. 4).

The condenser lens 14 condenses the light diffused by the one-directional diffuser plate 13. The condenser lens 14 is so arranged as to permit the diffused light to efficiently form an optical pupil E. The LCD 15 modulates the light incident thereon according to an image signal and thereby displays an image. The LCD 15 will be described in detail later.

The eyepiece optical system 21 includes two transparent base members 22 and 23 and an optical element 24. The eyepiece optical system 21 serves simultaneously as both an optical device that permits the outside-world image to be observed in a see-through fashion via the bonding surfaces of the transparent base members 22 and 23 and an optical device that directs an enlarged virtual image of the image displayed on the image display element 11 to the observer's eye. The eyepiece optical system 21 has a non-axisymmetric positive optical power so as to satisfactorily correct the aberrations in the image light that has entered it.

The transparent base members 22 and 23 are formed of, for example, acrylic resin, and are joined together with adhesive 25. Here, the transparent base member 22 is a plane-parallel plate of which a bottom-end part is made increasingly thin toward the bottom end thereof so as to be shaped like a wedge and of which a top-end part is made increasingly thick toward the top end thereof. The transparent base member 23 is a plane-parallel plate of which a top-end part is so shaped as to fit the bottom-end portion of the transparent base member 22 so that the transparent base members 22 and 23 together form substantially a plane-parallel plate.

If the transparent base members 22 and 23 are not joined together, the light of the outside-world image is refracted when it passes through the wedge-shaped bottom-end portion of the transparent base member 22. This produces distortion in the outside-world image observed via the transparent base member 22. By contrast, when the transparent base members 22 and 23 are joined together so as to together form substantially a plane-parallel plate, the refraction that the light of the outside-world image undergoes when it passes through the wedge-shaped bottom-end part of the transparent base member 22 is cancelled with the transparent base member 23. This helps prevent distortion from being produced in the outside-world image observed in a see-through fashion.

The optical element 24 is built with a volume-phase-type reflective hologram that diffracts light in three wavelength bands of, for example, 465±10 nm, 520±10 nm, and 635±10 nm that is incident thereon at a prescribed angle of incidence.

The optical element 24 is bonded to the slanted surface of the bottom-end portion of the transparent base member 22, and thus the optical element 24 is held between the transparent base members 22 and 23. The transmittance of the optical element 24 is set to be 10% or more.

Figure 6:
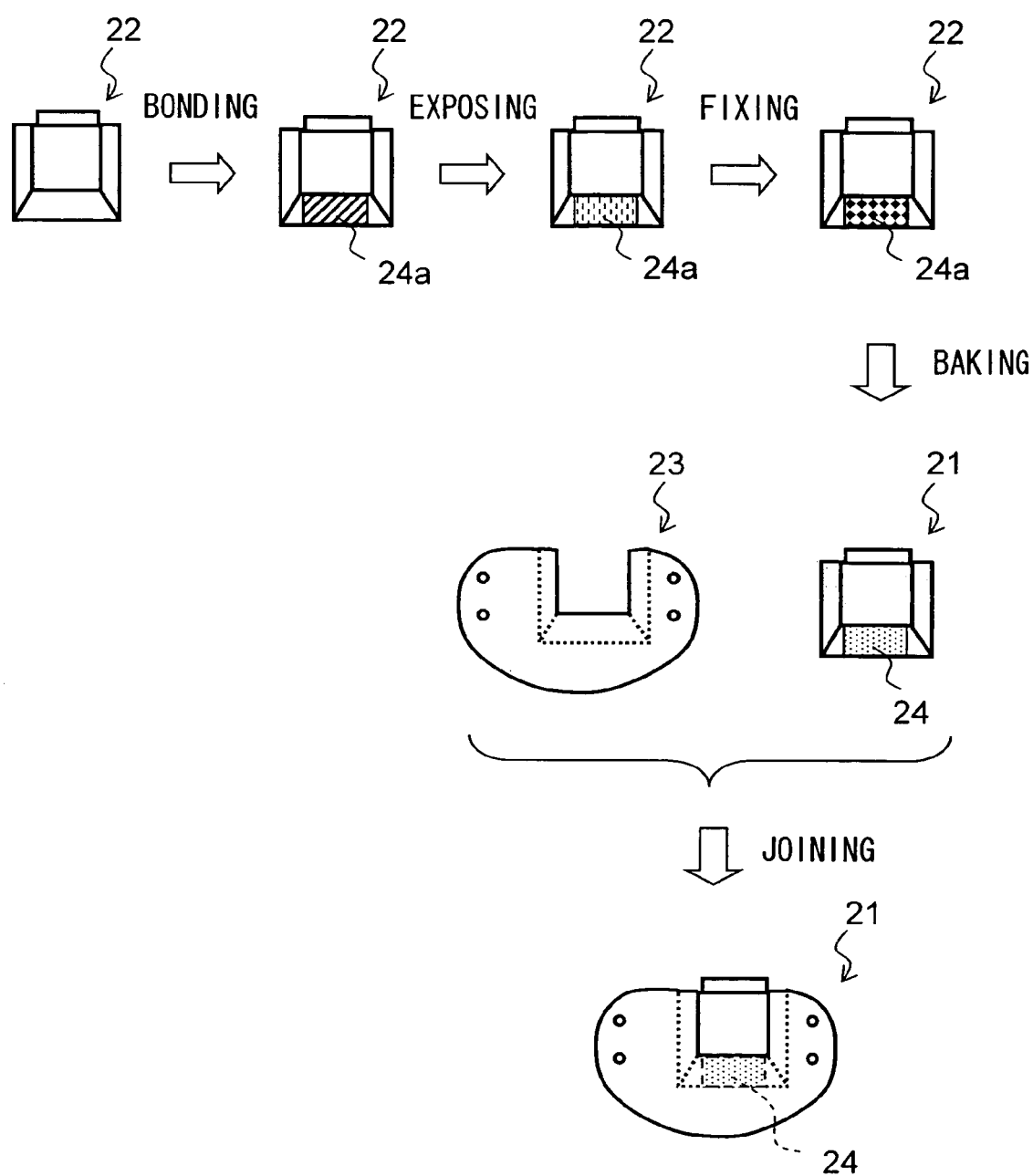
FIG. 6 is a diagram schematically illustrating the production procedure of the above eyepiece optical system.

The optical element 24 is formed of a hologram photosensitive material 24a (see FIG. 6) such as a photopolymer, a silver-halide-based material, or gelatin bichromate. Among the just mentioned materials, a photopolymer is particularly preferable because it can be produced by a dry process.

In the image display apparatus 1 structured as described above, the light emitted from the light source 12 of the image display element 11 is diffused by the one-directional diffuser plate 13, is then condensed by the condenser lens 14, and is then incident on the LCD 15. The light incident on the LCD 15 is modulated according to an image signal, and then exits, as an image light, from the LCD 15. Here, the LCD 15 displays an image itself.

The image light from the LCD 15 enters the transparent base member 22 of the eyepiece optical system 21 via the top-end surface thereof, and is then totally reflected a plurality of times on the mutually opposite surfaces thereof so as to be incident on the optical element 24. The light incident on the optical element 24 is reflected thereon so as to reach the optical pupil E. At the position of the optical pupil E, the observer observes an enlarged virtual image of the image displayed on the LCD 15. The distance from the optical pupil E to the virtual image is about several meters, and the size of the virtual image is ten or more times as large as the image displayed on the LCD 15.

On the other hand, the transparent base members 22 and 23 and the optical element 24 transmit most of the light from the outside world, and thus permit the observer to observe the outside-world image. Thus, the virtual image of the image displayed on the LCD 15 is observed overlaid on part of the outside-world image. As will be understood from the foregoing, the optical element 24 can be said to function as a combiner that simultaneously directs the image formed by the image display element 11 and the outside-world image to the observer's eye.

As described above, the image display apparatus 1 is so structured that the image light exiting from the LCD 15 is directed to the optical element 24 by being totally reflected within the transparent base member 22. This makes it possible to arrange the image display element 11 far away from immediately before the observer's eye, and thereby permits the observer to observe the outside world via a wide field of view. Moreover, it is possible to make the transparent base members 22 and 23 as thin as about 3 mm, like common eyeglass lenses, and thereby to make the image display apparatus 1 compact and lightweight.

Moreover, since the optical element 24 diffracts only light of prescribed wavelengths that is incident thereon at a prescribed angle of incidence, it does not affect the light of the outside-world image that is transmitted through the transparent base members 22 and 23 and the optical element 24. Thus, the observer can as usual observe the outside-world image via the transparent base members 22 and 23 and the optical element 24. Moreover, since the transmittance of the optical element 24 is set to be 10% or more, the observer can observe the outside-world image sufficiently clearly via the transparent base members 22 and 23 and the optical element 24.

3. Transparent Base Members

Figure 5A:
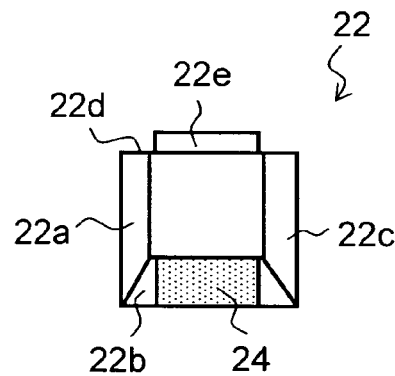
FIG. 5A is a plan view showing an outline of the structure of one of the two transparent base members forming the above eyepiece optical system.
Figure 5B:
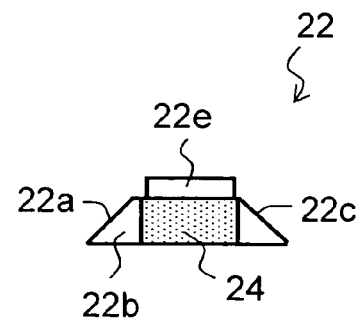
FIG. 5B is a front view of the above transparent base member.
Figure 5C:
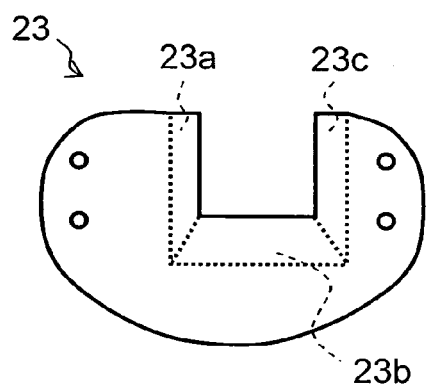
FIG. 5C is a plan view showing an outline of the structure of the other transparent base member.
Figure 5D:
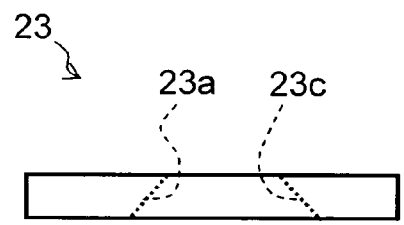
FIG. 5D is a front view of the above transparent base member.
Figure 5E:
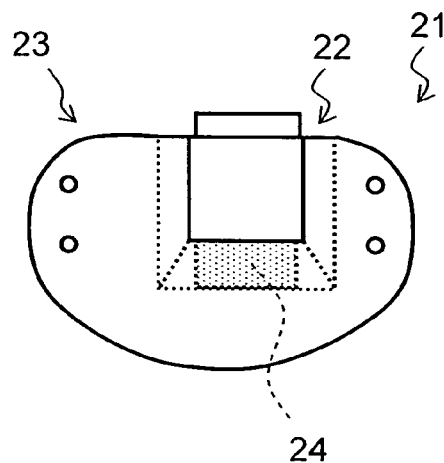
FIG. 5E is a plan view of the above eyepiece optical system.

Next, the transparent base members 22 and 23 will be described in detail. FIG. 5A is a plan view of the transparent base member 22 (the first transparent base member), and FIG. 5B is a front view of the transparent base member 22. FIG. 5C is a plan view of the transparent base member 23 (the second transparent base member), and FIG. 5D is a front view of the transparent base member 23. FIG. 5E is a plan view of the eyepiece optical system 21 having the transparent base members 22 and 23 joined together.

The transparent base member 22 as a whole has the shape of a truncated rectangular pyramid, with the top and bottom surfaces thereof joined by four side surfaces. These four side surfaces are surfaces 22a, 22b, 22c, and 22d located in this order counter-clockwise around the top surface. These surfaces 22a, 22b, 22c, and 22d are so oriented that the lines normal thereto point in mutually different directions. One of these surfaces (for example, the surface 22d) has part thereof formed into a protruding portion 22e that protrudes upward from the top surface. The optical element 24 is bonded to, for example, the surface 22b of the transparent base member 22.

On the other hand, the transparent base member 23 is so shaped that, when the transparent base member 22 is joined thereto, they together form a plane-parallel plate. That is, the transparent base member 23 has the shape of a plane-parallel plate from which the shape of the transparent base member 22 has been removed. Here, the surfaces of the transparent base member 23 that face the surfaces 22a, 22b, and 22c of the transparent base member 22 when the transparent base members 22 and 23 are joined together are called the surfaces 23a, 23b, and 23c, respectively. These surfaces 23a, 23b, and 23c are so oriented that the lines normal thereto point in mutually different directions.

In this way, to one transparent base member 22 having the optical element 24 bonded thereto, the other transparent base member 23 is joined with the adhesive 25 so that the optical element 24 is held in between, and thereby the eyepiece optical system 21 shown in FIG. 5E is formed. Seen in a plan view, the eyepiece optical system 21 is shaped like an eyeglass lens. With this eyepiece optical system 21, the outside-world image can be observed in a see-through fashion via the joint surfaces (the surfaces 22a, 22b, 22c, 23a, 23b, and 23c) of the transparent base members 22 and 23.

4. Production Procedure of the Eyepiece Optical System

Next, the production procedure of the eyepiece optical system 21 as an optical device will be described. The production procedure of the eyepiece optical system 21 involves the following five processes: a bonding process, an exposure process, a fixing process, a baking (heat treatment) process, and a joining process. While the production of the eyepiece optical system 21 through these processes is called "fabrication" of the optical element 24, the use of the thus fabricated optical element 24 in one of various devices is called "reproduction" thereof, for distinction between those two phases. Now, the above-mentioned production procedure will be described in detail with reference to FIG. 6.

Figure 7:
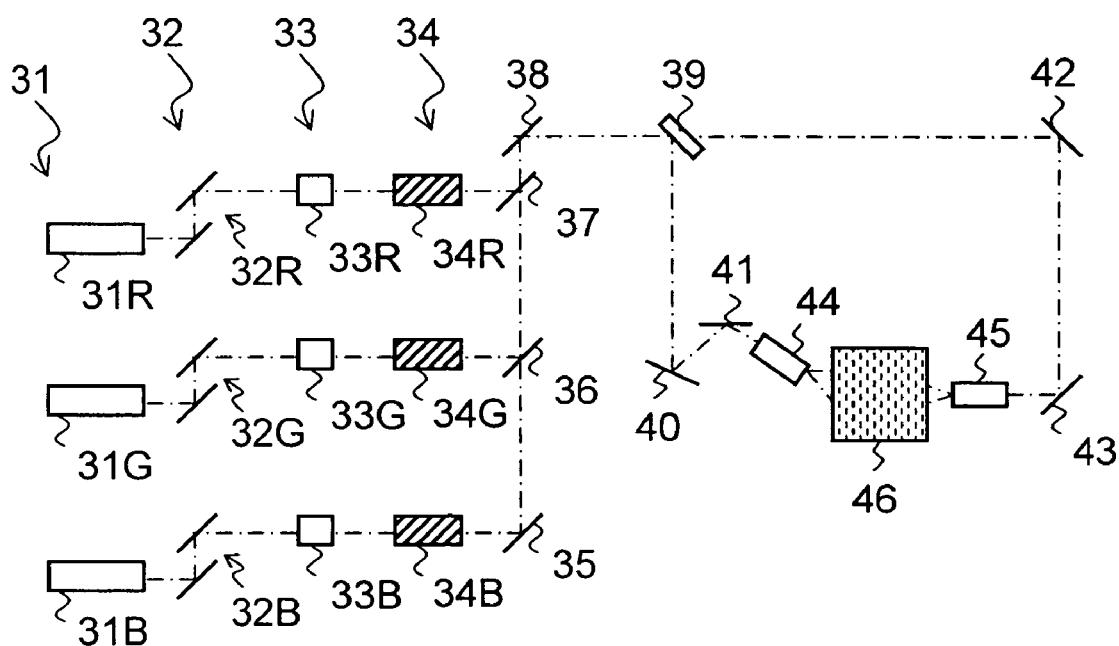
FIG. 7 is a diagram illustrating an outline of the structure of an exposure optical system used in the production of the above eyepiece optical system.

First, on one transparent base member 22 to be used during reproduction, a hologram photosensitive material 24a, for example a photopolymer, is bonded (the bonding process). Then, by two-beam interference of laser light, the hologram photosensitive material 24a on the transparent base member 22 is exposed (the exposure process). Incidentally, in the bonding and exposure processes, to prevent damage to the transparent base member 22, the transparent base member 22 is held on a holder, and this holder is handled so as to be set in a production optical system 46 (FIG. 7). Advisably, the production optical system 46 holds both the holder and the prism held thereon simultaneously by air suction.

Subsequently, the hologram photosensitive material 24a is irradiated with ultraviolet rays so as to be fixed (the fixing process). Then, the hologram photosensitive material 24a bonded on the transparent base member 22 is baked to form a hologram (the optical element 24) with high diffraction efficiency. Then, lastly, on the joint surfaces at which the transparent base members 22 and 23 are joined together, ultraviolet-curing adhesive, which is a kind of light-curing adhesive, is applied, and is then irradiated with ultraviolet rays so as to be cured. Thus, the transparent base members 22 and 23 are joined together with the hologram photosensitive material 24a (optical element 24) held between them (the joining process). In this way, the eyepiece optical system 21 is formed.

Incidentally, the reason that the diffraction efficiency of the hologram increases in the baking process is as follows. Exposing the hologram photosensitive material 24a produces interference fringes, forming high- and low-refractive-index portions in the hologram. However, since the photopolymer used as the hologram photosensitive material 24a is a polymer material, simply exposing it does not provide a sufficiently large difference in refractive index between the high- and low-refractive-index portions. Here, conveniently, when heat is applied to the hologram photosensitive material 24a in the baking process, unreacted monomers and the like in the hologram photosensitive material 24a are diffused by the heat, producing a large difference in density. This increases the difference in refractive index within the hologram, and thus increases the diffraction efficiency thereof.

The baking process may be performed after the joining process. In that case, part of the adhesive that remains uncured after joining may adversely affect the hologram layer. For this reason, it is preferable that, as in the embodiment under discussion, baking be completed before joining.

The hologram photosensitive material 24a used may be one composed of a single layer that is sensitive to a plurality of wavelengths, or one composed of a plurality of layers that are each sensitive to a different wavelength. The exposure in the exposure process may be performed by starting irradiation with laser light of a plurality of wavelengths (R, G, and B) at the same time or with delays secured among the different wavelengths. Examples of combinations of the type of the hologram photosensitive material 24a and the method of exposure are, to name only a few among many different combinations, as follows:

"One RGB photosensitive layer" combined with "exposure with irradiation started at the same time";

"One RGB photosensitive layer" combined with "exposure with irradiation started at different times";

"Three, namely R, G, and B, photosensitive layers" combined with "exposure with irradiation started at the same time";

"Three, namely R, G, and B, photosensitive layers" combined with "exposure with irradiation started at different times";

"Two, namely R and GB, photosensitive layers" combined with "exposure with irradiation started at the same time";

"Two, namely R and GB, photosensitive layers" combined with "exposure with irradiation started at different times";

"Two, namely RGB and R, photosensitive layers" combined with "exposure with irradiation started at the same time"; and "Two, namely RGB and R, photosensitive layers" combined with "exposure with irradiation started at different times".

Here, when "one RGB photosensitive layer" is used, holograms of a plurality of wavelengths can be recorded in a single photosensitive layer. This helps simplify the structure and facilitate the fabrication of the hologram. When "three, namely R, G, and B, photosensitive layers" are used, a hologram of one wavelength is recorded in each layer. This helps prevent different colors from affecting each other within a layer, and thus makes it easy to obtain high diffraction efficiency.

Using "two, namely R and GB, photosensitive layers (or, alternatively, B and RG photosensitive layers, or G and RB photosensitive layers)" is simpler than using separate layers for different wavelengths, and permits less interference fringes to be recorded in each layer, making it easy to obtain high diffraction efficiency. Using "two, namely RGB and R, photosensitive layers (or, alternatively, RGB and G, RGB and B, or any other possible combination of photosensitive layers), that is, using a layer that permits holograms of a plurality of wavelengths to be recorded therein in combination with a photosensitive layer sensitive to one of those colors, helps enhance the diffraction efficiency at the wavelength of the additional layer.

5. Exposure Optical System

Next, the exposure optical system used in the exposure process mentioned above will be described with reference to FIG. 7. FIG. 7 is a diagram illustrating an outline of the structure of the exposure optical system used in this embodiment.

The exposure optical system is built with light sources 31, beam steerers 32, shutters 33, beam expanders 34, a mirror 35, dichroic mirrors 36 and 37, a mirror 38, a beam splitter 39, mirrors 40, 41, 42, and 43, spatial filters 44 and 45, and a production optical system 46. The exposure optical system may be provided with any number of mirrors other than specifically described above as necessary.

The light sources 31 serve as a fabrication light source that emits laser light with which to expose the hologram photosensitive material 24a on the transparent base member 22 in order to form the optical element 24 on the transparent base member 22. The light sources 31 include light sources 31R, 31G, and 31B that emit laser light of R (red), G (green), and B (blue) colors, respectively.

Here, used as laser light of each of the three, namely R, G, and B, colors is as follows. Used as the R laser light is, for example, krypton ion laser or helium neon laser; used as the G laser light is, for example, solid-state laser such as Nd:YAG (SHG) or Nd:YVO4 (SHG) or pigment laser; used as the B laser light is, for example, solid-state laser such as argon ion laser or sapphire laser.

The beam steerers 32 include beam steerers 32R, 32G, and 32B corresponding to R, G, and B, respectively. The beam steerers 32R, 32G, and 32B are each composed of two mirrors, and reflect, with those mirrors, the laser light of the different colors from the light sources 31R, 31G, and 31B so that the laser light of all the colors emanate at an equal height.

The shutters 33 include shutters 33R, 33G, and 33B corresponding to R, G, and B, respectively. The shutters 33R, 33G, and 33B individually turn on and off transmission therethrough of the R, G, and B laser light incoming from the beam steerers 32R, 32G, and 32B, and thereby function as a means for adjusting the amounts of R, G, and B laser light with which to expose the hologram photosensitive material 24a.

The beam expanders 34 include beam expanders 34R, 34G, and 34B corresponding to R, G, and B, respectively. These serve to expand the beam sizes of the R, G, and B laser light and to vary the numerical apertures thereof. The beam expanders 34 adjust the R, G, and B laser light in such a way that the Gaussian intensity distributions of the R, G, and B laser light substantially agree. The beam expanders 34 are disposed between the beam waist positions of the R, G, and B laser light emitted from the light sources 31 and the production optical system 46.

The mirror 35 reflects the B laser light exiting from the beam expander 34B toward the dichroic mirror 36. The dichroic mirror 36 reflects the G laser light exiting from the beam expander 34G toward the dichroic mirror 37, and simultaneously transmits the B laser light reflected from the mirror 35 toward the dichroic mirror 37. Thus, from the dichroic mirror 36 exits the G and B laser light having undergone color integration.

The dichroic mirror 37 reflects the R laser light exiting from the beam expander 34R toward the mirror 38, and simultaneously transmits the G and B laser light obtained via the dichroic mirror 36 toward the mirror 38. Thus, from the dichroic mirror 37 exits the R, G, and B laser light having undergone color integration. The mirror 38 reflects the R, G, and B laser light obtained via the dichroic mirror 37 toward the beam splitter 39.

The beam splitter 39 splits the incoming R, G, and B laser light between two optical paths. Used as the beam splitter 39 is, for example, a transmissive/reflective mirror (half-mirror) coated with chromium or multilayer film, or a polarizing beam splitter. The split ratio at which the beam splitter 39 splits the laser light beam into two is so set that, on the exposure surface of the hologram photosensitive material 24a disposed within the production optical system 46, the two split light beams contain approximately an equal amount of light.

It is preferable that the beam splitter 39 split laser light of different wavelengths approximately at an equal split ratio. By using a transmissive/reflective mirror coated with chromium or multilayer film having a desired reflectance/transmittance ratio, it is possible to easily obtain a beam splitter 39 that splits laser light of different wavelengths approximately at an equal split ratio.

The mirrors 40 and 41 are disposed in one of the two optical paths between the beam splitter 39 and the production optical system 46, and reflect, one after the other, the R, G, and B laser light incoming from the beam splitter 39 to direct it to the spatial filter 44. The mirrors 42 and 43 are disposed in the other of the two optical paths between the beam splitter 39 and the production optical system 46, and reflect, one after the other, the R, G, and B laser light incoming from the beam splitter 39 to direct it to the spatial filter 45.

The spatial filters 44 and 45 are each composed of a lens (objective lens) and a pinhole, and condense, with those lenses, the incoming laser light so as to let it emanate through the pinholes and enter the production optical system 46. The production optical system 46 is composed of lenses, prisms, mirrors, and the like so combined as to form an exposure optical path that suits the optical device to be fabricated. Through this production optical system 46, the R, G, and B laser light is ultimately shone onto the hologram photosensitive material 24a.

In the structure described above, the B laser light emitted from the light source 31B travels via the beam steerer 32B, the shutter 33B, an the beam expander 34B in this order, and then reaches, via the mirror 35, the dichroic mirror 36. The G laser light emitted from the light source 31G travels via the beam steerer 32G, the shutter 33G, and the beam expander 34G in this order, then undergoes color integration with the B laser light in the dichroic mirror 36, and then reaches the dichroic mirror 37. The R laser light emitted from the laser light 31R travels via the beam steerer 32R, the shutter 33R, and the beam expander 34R in this order, then undergoes color integration with the G and B laser light in the dichroic mirror 37, and then reaches the mirror 38.

The RGB laser light that has reached the mirror 38 is reflected thereon to reach the beam splitter 39, where the laser light is split between two optical paths. Along one optical path, the RGB laser light that has exited from the beam splitter 39 is reflected on the mirrors 40 and 41 in this order, and then enters, via the spatial filter 44, the production optical system 46. Along the other optical path, the RGB laser light that has exited from the beam splitter 39 is reflected on the mirrors 42 and 43 in this order, and then enters, via the spatial filter 45, the production optical system 46. From the RGB laser light incoming along the two optical paths, the production optical system 46 produces two desired exposure beams, and makes them interfere with each other within the hologram photosensitive material 24a on the transparent base member 22, and thereby fabricates the optical element 24 as a hologram.

In FIG. 7, the shutters 33 and the beam expanders 34 are arranged independently in the three, namely R, G, and B, laser optical paths. Instead, one shutter and one beam expander common to R, G, and B may be arranged where the RGB laser light has been bundled into a single beam by the dichroic mirrors 36 and 37. Moreover, advisably, the polarization direction of the RGB laser light is set to be parallel (p-polarized) or perpendicular (s-polarized) to the optical stage, because then the laser light does not rotate its polarization direction even when, for example, reflected on a mirror.

6. Method of Exposure

Next, a description will be given of how the hologram photosensitive material 24a is exposed in the exposure optical system described above.

The wavelengths (reproduction wavelengths) of the light (reproduction light) emanating from the optical element 24 during reproduction are determined by the wavelengths of the laser light to which the hologram photosensitive material 24a is exposed during fabrication. Accordingly, to obtain single-color reproduction light during reproduction, it is necessary to expose the hologram photosensitive material 24a to laser light of at least one color. On the other hand, to obtain colored reproduction light during reproduction, it is necessary to expose the hologram photosensitive material 24a to laser light of a plurality of wavelengths corresponding to the desired colors. From the perspective of enjoying images, colored reproduction is preferable, and accordingly, in this embodiment, the hologram photosensitive material 24a is exposed to laser light of three wavelengths corresponding to red (R), green (G), and blue (B) during fabrication so that color images (reproduced images) are obtained during reproduction.

Here, to achieve satisfactory color display, it is necessary to achieve a good color balance in the brightness of different colors (for example, R, G, and B). With an optical element 24 whose diffraction efficiency exhibits diffraction peaks at three, namely R, G, and B, colors, if the optical element 24 can be so fabricated that its diffraction efficiency is approximately 100% at all the R, G, and B diffraction peaks, it is possible to achieve a good color balance by adjusting the intensity of the light sources of the different colors and to obtain bright color display. Incidentally, "diffraction efficiency" is a quantity that indicates what proportion of the energy of incident light can be extracted as diffracted light, and is generally calculated as a percentage of the intensity of diffracted light of a particular order relative to the intensity of incident light. With an optical element that has a diffraction peak for one color, it is comparatively easy to fabricate a hologram whose diffraction efficiency is almost 100%.

However, with the optical element 24 formed as a color hologram having diffraction peaks at a plurality of wavelengths, since generally the hologram photosensitive material 24a is sensitive to light of a plurality of wavelengths, its sensitivity to different wavelengths mutually affects, making it practically difficult to obtain diffraction efficiency of 100% at all the wavelengths. There is observed a trade-off relationship among the diffraction efficiency at a plurality of wavelengths; that is, when exposure is performed so as to increase diffraction efficiency at one wavelength, the diffraction efficiency at other wavelengths tends to diminish.

On the other hand, the brightness of an image is expressed, in simplified terms, as the sum of the "diffraction efficiency multiplied by the intensity of illumination light at the wavelength of diffracted light (diffraction wavelength)" for different colors. Thus, a good color balance in the image is achieved by adjusting the values of the "diffraction efficiency multiplied by the intensity of illumination light at the wavelength of diffracted light (diffraction wavelength)" for different colors so that they are in a given ratio that produces satisfactory white display. This ratio is constant, through depending on diffraction wavelength.

As discussed above, with a color hologram having a plurality of diffraction wavelengths, it is difficult to obtain diffraction efficiency of 100% at all the wavelengths, and a trade-off relationship is observed among the different wavelengths. Thus, to obtain color display with maximum brightness and a good color balance, it is advisable to adjust the exposure amounts of laser light of different wavelengths ($R_2$, $G_2$, and $B_2$) from the fabrication light source (the light sources 31) in such a way that the diffraction efficiency at the individual peak wavelengths ($R_1$, $G_1$, and $B_1$) in the optical element 24 is commensurate with the light intensity at the individual peak wavelengths ($R_1$, $G_1$, and $B_1$) in the light emitted from the reproduction light source (the light source 12).

Figure 1A:
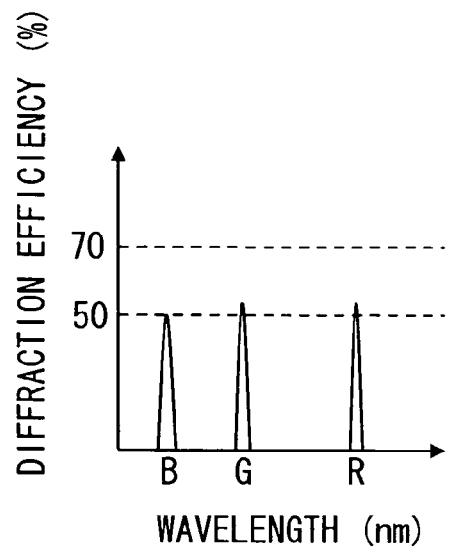
FIG. 1A is a graph showing an example of the diffraction efficiency at different wavelengths as observed in the optical element included in the eyepiece optical system of the image display apparatus used in a head-mounted display embodying the present invention.

For example, suppose that an optical element 24 is so fabricated that its diffraction efficiency is approximately equal for three, namely R, G, and B, colors as shown in FIG. 1A. When this optical element 24 is illuminated with approximately the maximum amount of light from the illumination light source (the light source 12 as the reproduction light source) shown in FIG. 1B, the intensity of G and R light is insufficient to produce white display. In this embodiment, therefore, the G and R light intensity of the reproduction light source is taken into consideration by adjusting, with the shutters 33, the amounts of R, G, and B laser light with which the hologram photosensitive material 24a is exposed in such a way that the diffraction efficiency of the optical element 24 for G and R light is higher than that for G light (and the diffraction efficiency for R light is still higher than that for G light).

Figure 1B:
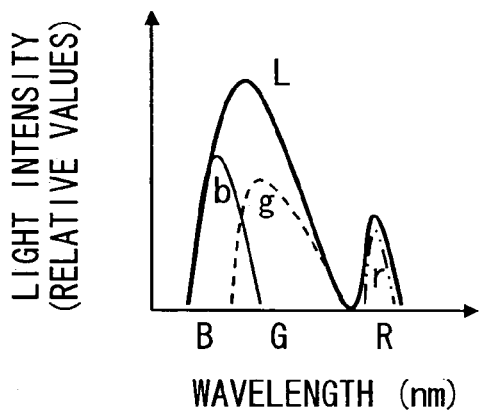
FIG. 1B is a graph showing the relationship between the wavelength and intensity of the light source that feeds light to the above optical element during reproduction.

In FIG. 1B, the curves "r", "g", and "b" represent the R, G, and B light intensity, respectively, and the curve "L" represents the sum of the R, G, and B light intensity. Here, all light intensity values are given relative to, for example, the B light intensity.

Figure 1C:
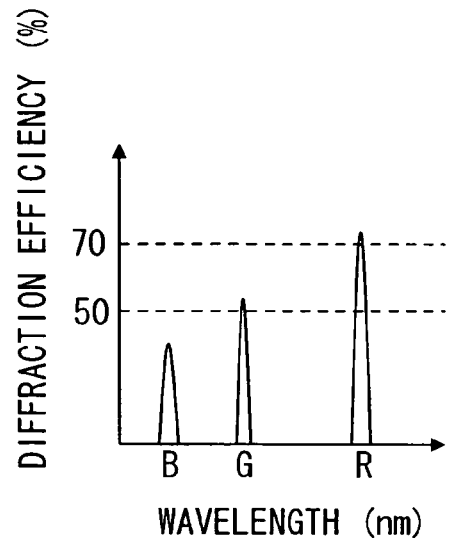
FIG. 1C is a graph showing another example of the diffraction efficiency at different wavelengths in the above optical element.

As described above, in this embodiment, illumination is performed with approximately the maximum amount of light from the reproduction light source, and, with consideration given to the light intensity at the individual R, G, and B diffraction peak wavelengths in the illumination light, the diffraction efficiency at the individual diffraction peak wavelengths is determined. Then, the exposure amounts of laser light of the different colors are adjusted in such a way that the thus set diffraction efficiency is obtained. In this way, even when the light intensity of the reproduction light source is increasingly low for B, G, and R in this order (see FIG. 1B), the optical element 24 can be so fabricated that the diffraction efficiency thereof is increasingly higher for B, G, and R in this order (see FIG. 1C). That is, a shortage in light intensity at a given wavelength in the reproduction light source is compensated for by diffraction efficiency higher at that wavelength than at the other wavelengths in the optical element 24. Thus, it is possible to adjust the hue of the light (reproduction light) obtained from the reproduction light source via the optical element 24 to the one desired with every reproduction light source used, while the most is made of the light emitted from the reproduction light source used. As a result, it is possible to obtain, with every reproduction light source used, a bright image with a good color balance.

In particular, when the exposure amounts of laser light of the different wavelengths from the fabrication light source are so adjusted that the diffraction efficiency at the individual wavelengths in the optical element 24 is such that the reproduction light obtained from the reproduction light source via the optical element 24 is white, it is possible to securely obtain, via the optical element 24, a color image with a good color balance.

Here, it is preferable that the exposure amounts of laser light of the different wavelengths from the fabrication light source be so adjusted that, when the optical element 24 is fed with light obtained by making the reproduction light source emit light at light intensity corresponding to 70% or more of the amount of light that it is rated to emit, the diffraction efficiency at the individual diffraction peak wavelengths in the optical element 24 is such that the reproduction light emanating from the optical element 24 is white. In this case, since the reproduction light source is made to emit light at light intensity corresponding to 70% or more of the amount of light that it is rated to emit, it is possible to realize, as the color image obtained via the optical element 24, a bright color image with a good color balance.

From the perspectives of image brightness and efficient use of the light of the reproduction light source, it is advisable to fabricate the optical element 24 so that the maximum diffraction efficiency among the different wavelengths (R, G, and B) at which diffraction efficiency has peaks is 70% or more.

Based on the foregoing, it can be said that, in this embodiment the exposure amounts of laser light of the different wavelengths from the fabrication light source are adjusted in such a way that the diffraction efficiency at the individual peak wavelengths (R, G, and B) in the optical element 24 is increasingly high at the different wavelengths in the order (in FIG. 1B, in the following order: B, then G, and then R) in which the light intensity of the light emitted from the reproduction light source is increasingly low.

Figure 8:
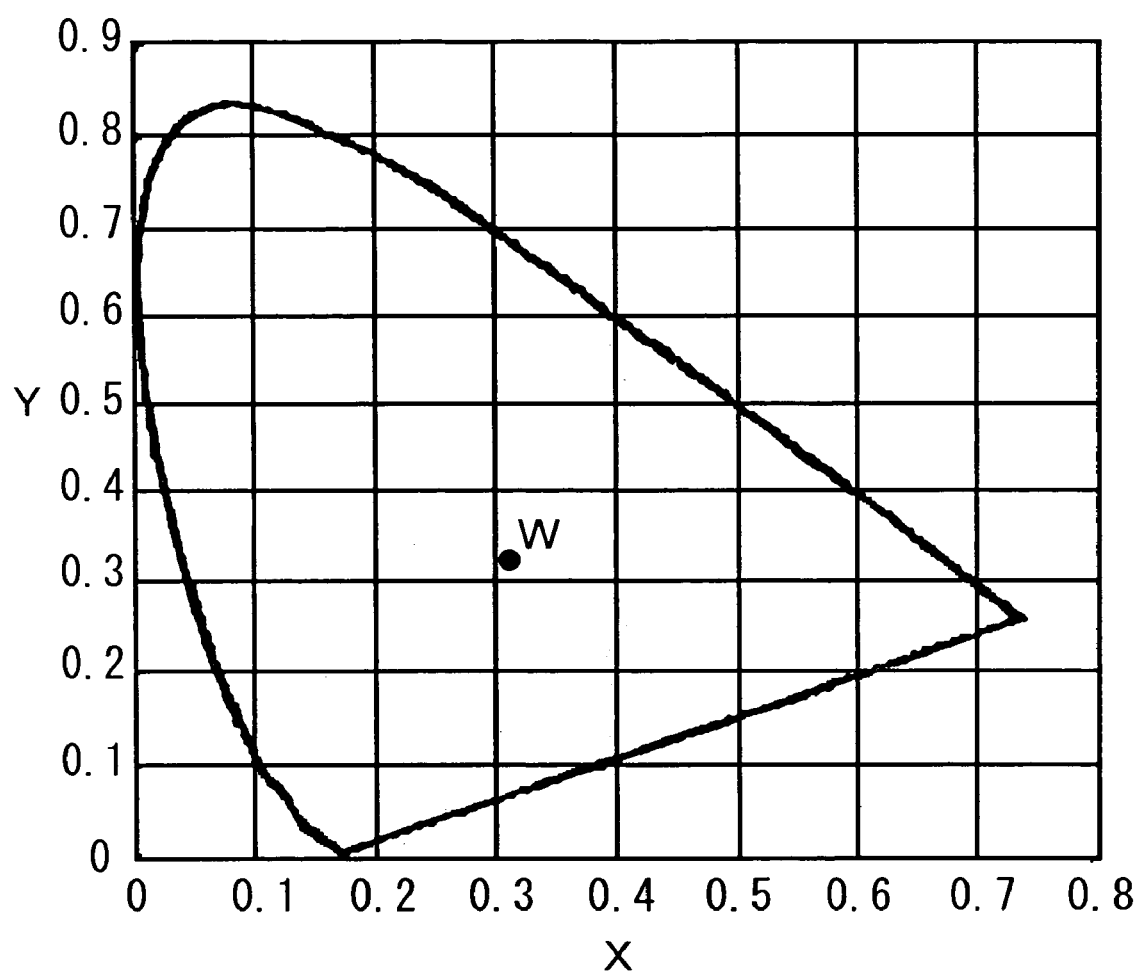
FIG. 8 is a diagram illustrating XY chromaticity coordinates in the XYZ color system.

FIG. 8 shows XY chromaticity coordinates in the XYZ color system. As described above, to obtain a bright color display, the exposure amounts need to be so adjusted that, when the reproduction light source is made to emit approximately the maximum amount of light (70% or more of the amount of light that it is rated to emit), the reproduction light from the beam expanders 34 is white. Here, the illumination light from the reproduction light source does not necessarily have to appear white to the naked eye. So long as the reproduction light has a color within the range defined as (X, Y)=(0.32±005, 0.33±0.05) when expressed in XY chromaticity coordinates as shown in FIG. 8 (that is, a color around point W in FIG. 8), the reproduction light is perceived as white by a human. Accordingly, by adjusting the exposure amounts of R, G, and B light in such a way that the reproduction light has a color whose XY chromaticity coordinates are within the above-mentioned range, and then fabricating the optical element 24 with the thus adjusted exposure amounts, it is possible to obtain, by the use of the so fabricated optical element 24, a bright color image with a good color balance.

Moreover, in this embodiment, an LED is used as the light source 12 serving as the reproduction light source, and the light source 12 is made to emit red (R), green (G), and blue (B) light independently. This makes it easy to produce an optical device with consideration given to the light intensity of the light source 12 for each of the different colors.

7. Diffraction Efficiency Distribution on the Exposure Surface

Next, a description will be given of the distribution of diffraction efficiency on the exposure surface of the hologram photosensitive material 24a.

As described previously, to obtain color display via the optical element 24, interference fringes of a plurality of wavelengths (R, G, and B) need to be recorded on the same exposure surface of the hologram photosensitive material 24a. Here, to achieve display with even colors over the entire image irrespective of the position of the observer's pupil, it is necessary, as described above, to set the diffraction efficiency for the different colors (R, G, and B) with consideration given to the intensity of the light from the reproduction light source, and in addition to perform exposure in such a way that the ratio of diffraction efficiency among the different colors (R, G, and B) for which the interference fringes are recorded is constant at any point over the entire exposure surface of the hologram photosensitive material 24a.

Figure 9A:
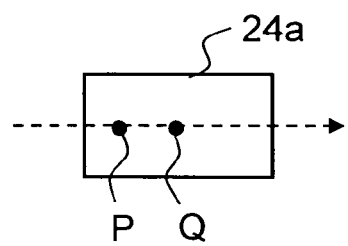
FIG. 9A is a plan view of the exposure surface of a hologram photosensitive material.
Figure 9B:
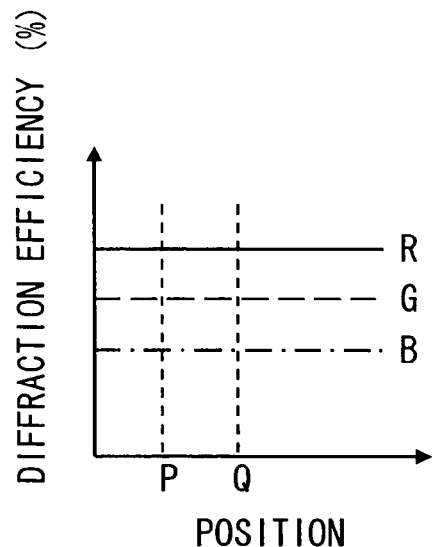
FIG. 9B is a graph showing an example of the relationship between the position on the above exposure surface in the major-axis direction thereof and the diffraction efficiency at the R, G, and B wavelengths.
Figure 9C:
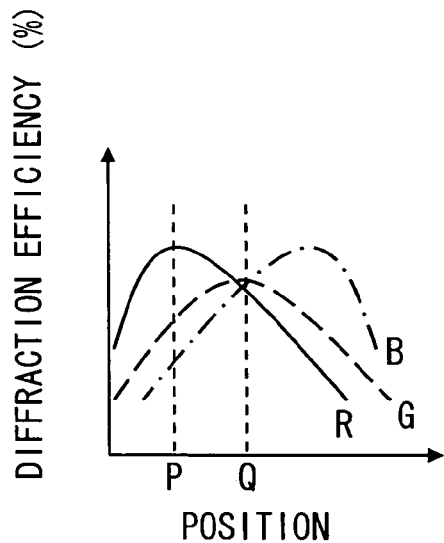
FIG. 9C is a graph showing another example of the relationship between the position on the above exposure surface in the major-axis direction thereof and the diffraction efficiency at the R, G, and B wavelengths.
Figure 9D:
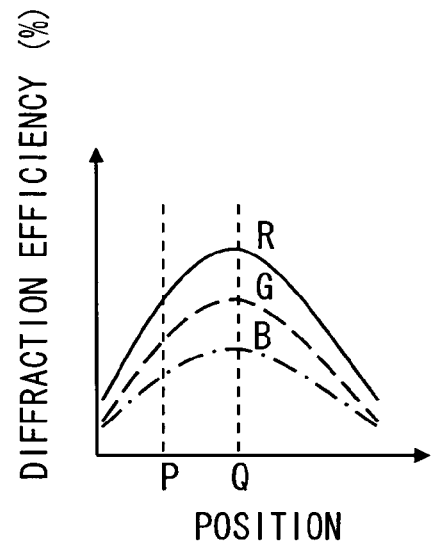
FIG. 9D is a graph showing a still another example of the relationship between the position on the above exposure surface in the major-axis direction thereof and the diffraction efficiency at the R, G, and B wavelengths.

FIG. 9A is a plan view of the exposure surface of the hologram photosensitive material 24a, and FIGS. 9B, 9C, and 9D each show the relationship between the position on the exposure surface in the major-axis direction thereof and the diffraction efficiency at the R, G, and B wavelengths at that position. Incidentally, the major-axis direction of the exposure surface denotes, when the exposure surface is rectangular, the direction along the longer sides thereof and, when the exposure surface is circular, the direction along a give diameter thereof, and, when the exposure surface is elliptic, the direction along the major axis thereof.

Ideally, when the diffraction efficiency for the different colors (R, G, and B) is equal over the entire exposure surface of the hologram photosensitive material 24a as shown in FIG. 9B, quite naturally the ratio (R:G:B) of the diffraction efficiency for the different colors is constant at any point on the exposure surface, and thus even colors are obtained within the image irrespective of the pupil position.

In reality, however, the RGB laser light used in hologram exposure exhibits an almost Gaussian intensity distribution when observed near where it leaves the laser emitter, and therefore has an intensity distribution related thereto on the exposure surface. That is, as a result of the laser light of the different, namely R, G, and B, colors having a Gaussian intensity distribution, the diffraction efficiency at each point on the exposure surface of the hologram photosensitive material 24a exhibits a distribution that is not quite the same as the intensity distribution of the laser light but that reflects it showing a similar tendency.

Thus, on the exposure surface of the hologram photosensitive material 24a exposed, diffraction efficiency is so distributed as to vary differently for R, G, and B as shown in FIGS. 9C and 9D. Here, if, as shown in FIG. 9C, the ratio (R:G:B) of R, G, and B diffraction efficiency differs between at two different points (for example, positions P and Q) on the exposure surface, uneven colors result within the image and depending on the pupil position. In the example shown in FIG. 9C, while the reproduction light obtained through position Q, located at the center of the exposure surface, is white, the image appears reddish at position P, a leftward position, because diffraction efficiency is higher at position P than at position Q.

Thus, in this case, as shown in FIG. 9D, the absolute values of R, G, and B diffraction efficiency may vary from one point to another over the entire image, but exposure needs to be performed with the R, G, and B laser light so adjusted that the ratio of the diffraction efficiency for the different colors is approximately constant (the ratio of exposure intensity for R, G, and B is approximately constant). This exploits the fact that a human easily discerns a slight change in color but not a slight change in brightness. The RGB laser light can be adjusted by adjusting exposure in the shutters 33, or by adjusting the beam sizes and the numerical apertures in the beam expanders 34.

In the optical element 24 thus fabricated with the laser light of the different wavelengths so adjusted that, at any position on the exposure surface of the hologram photosensitive material 24a, the ratio of the intensity of the laser light of the different wavelengths (R, G, and B) from the light sources 31 used as the fabrication light source is approximately constant, the ratio of the R, G, and B diffraction efficiency is approximately constant at any position. Thus, it is possible to alleviate overall color unevenness in the color image obtained via the optical element 24.

Here, in practical terms, it is difficult to make the diffraction efficiency ratio completely constant over the entire exposure surface of the hologram photosensitive material 24a. However, for the purpose of eliminating color unevenness as aimed at by the present invention, it suffices to limit the differences in the laser intensity of the different colors from one position to another on the exposure surface within 30% at every position on the exposure surface.

Specifically, let the intensity of the R, G, and B light emitted from the light sources 31 and shone at a first position (for example, position P) on the exposure surface of the hologram photosensitive material 24a be R1, G1, and B1, respectively, and let the intensity of the R, G, and B light shone at a second position (for example, position Q) on the exposure surface be R2, G2, and B2. Then, it is advisable to adjust the R, G, and B laser light so that at any two positions selected as positions P and Q, the following formulae holds:

$$|(R1/G1)-(R2/G2)| \leq 0.3 \times (R1/G1), \text{ and}$$

$$|(B1/G1)-(B2/G2)| \leq 0.3 \times (B1/G1)$$

This permits the differences in diffraction efficiency from one position to another on the optical element 24 fabricated to be reduced to about 20% or less. Thus, it is possible to suppress color unevenness from one position to another on the optical element 24 to a practically negligible level.

Figure 10:
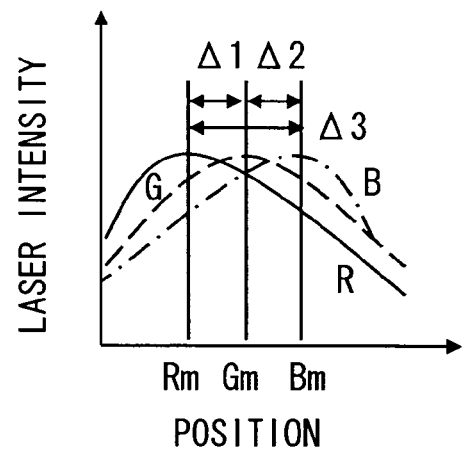
FIG. 10 is a graph showing an example of the relationship between the position on the exposure surface of the above hologram photosensitive material in the major-axis direction thereof and the laser intensity at the R, G, and B wavelengths.

When the hologram photosensitive material 24a is actually exposed to the RGB laser light, it takes trouble to measure whether or not the differences in the RGB laser intensity ratio is within 30% over the entire exposure surface of the hologram photosensitive material 24a. To avoid this, the RGB laser light may instead be adjusted by measuring, as shown in FIG. 10, the points Rm, Gm, and Bm at which the individual R, G, and B colors exhibit the highest laser intensity on the exposure surface and then making the positional deviations between those points Rm, Gm, and Bm smaller than one half or less of the length of the exposure surface in the major-axis direction thereof.

That is, the laser light of the different wavelengths may be adjusted in such a way that, the positional deviations, among the different wavelengths, of the positions (Rm, Gm, and Bm) on the exposure surface of the hologram photosensitive material 24a at which the laser light of the different wavelengths (R, G, and B) emitted from the light source 31 as the fabrication light source exhibits maximum intensity (that is, the values of Δ1=|Rm−Gm|, Δ2=|Gm−Bm|, and Δ3=|Bm−Rm|) is one half or less of the length of the exposure surface in the major-axis direction thereof By so doing, it is possible to limit the differences in diffraction efficiency among the different wavelengths within about 20% at any position on the ;surface of the optical element 24 fabricated. In this way, it is possible to easily and efficiently reduce the overall color unevenness in the color image obtained via the optical element 24 to a practically negligible level.

Figure 11A:
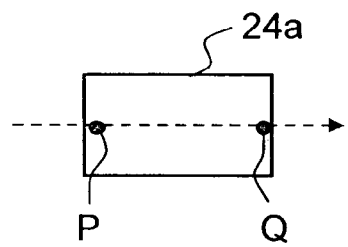
FIG. 11A is a plan view of the exposure surface of the above hologram photosensitive material.
Figure 11B:
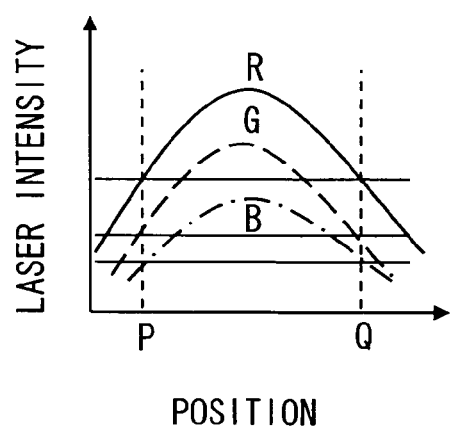
FIG. 11B is a graph showing another example of the relationship between the position on the above exposure surface in the major-axis direction thereof and the laser intensity at the R, G, and B wavelengths.

FIG. 11A is a plan view of the exposure surface of the hologram photosensitive material 24a, and FIG. 11B shows the relationship between the position on the exposure surface in the major-axis direction thereof and the intensity of the laser light of the R, G, and B wavelengths at that position. Consider two positions P and Q located at both ends of the exposure surface of the hologram photosensitive material 24a in the major-axis direction thereof. Then, the laser light of the different wavelengths may be so adjusted that the intensity of the laser light of the different wavelengths (R, G, and B) from the light source 31 as the fabrication light source is, for each wavelength, equal between at positions P and Q. That is, let the intensity of the R, G, and B laser light at position P be Rp, Gp, and Bp, and let the intensity of the R, G, and B laser light at position Q be Rq, Gq, and Bq. Then, the RGB laser light may be so adjusted that Rp≈Rq, Gp≈Gq, and Bp≈Bq. This helps further reduce color unevenness in simplified terms.

A human is poorer at discerning a difference in brightness than a difference in color. Even then, if the absolute intensity of the R, G, and B laser light differs greatly between different positions on the exposure surface of the hologram photosensitive material 24a, the difference may be perceived as a difference in brightness at the position of the observation pupil.

To avoid this, the laser light of the different wavelengths may instead be so adjusted that the difference in absolute intensity between at the position at which the laser light of the different wavelengths from the light source 31 as the fabrication light source exhibits maximum absolute intensity and at the position at which it exhibits minimum absolute intensity is, for each wavelength, 50% or less of the maximum absolute intensity for that wavelength. This helps reduce differences in diffraction efficiency, and hence differences in actual brightness, for each of R, G, and B in the optical element 24, and thus helps improve not only color unevenness but also brightness unevenness.

8. Setting Diffraction Efficiency in Consideration of the Power Consumption of the Light Source Also by setting the diffraction efficiency of the optical element 24 in consideration of the power consumption of the light source 12, it is possible to obtain, with every light source 12 used, a bright image with a good color balance and in addition to achieve power saving in the light source 12. Now, a description will be given of how the diffraction efficiency of the optical element 24 is set inconsideration of the power consumption of the light source 12.

Figure 12:
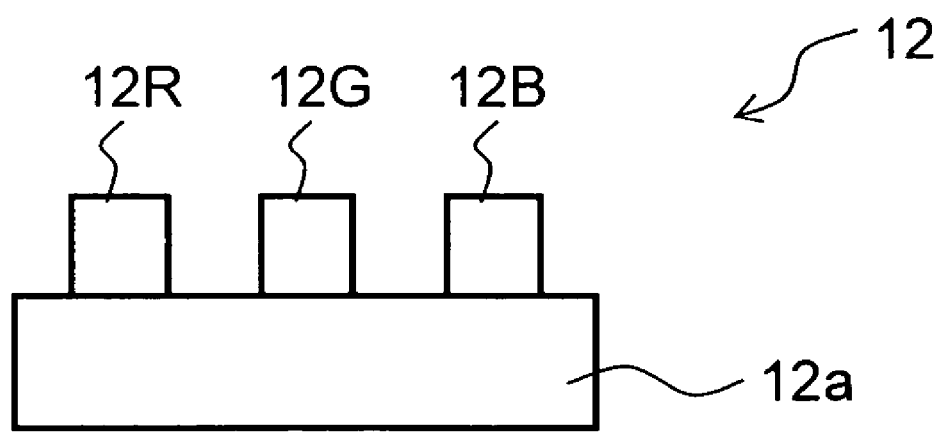
FIG. 12 is a diagram illustrating an example of the structure of the light source used in the above image display apparatus.

Here, it is assumed that, as the light source 12, a single-package light-emitting diode having separate light-emitting chips 12R, 12G, and 12B mounted on a substrate 12a as shown in FIG. 12 is used. These light-emitting chips 12R, 12G, and 12B are illumination light source corresponding to different diffraction peak wavelengths ($R_1$, $G_1$, and $B_1$).

Figure 13A:
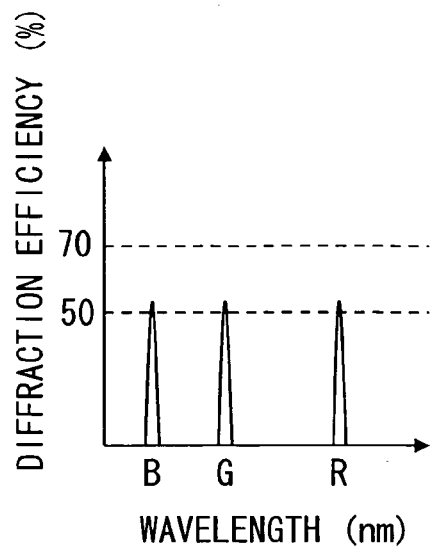
FIG. 13A is a graph showing an example of the diffraction efficiency at different wavelengths in an optical element whose diffraction efficiency has been set without consideration given to the power consumption of the above light source.
Figure 13B:
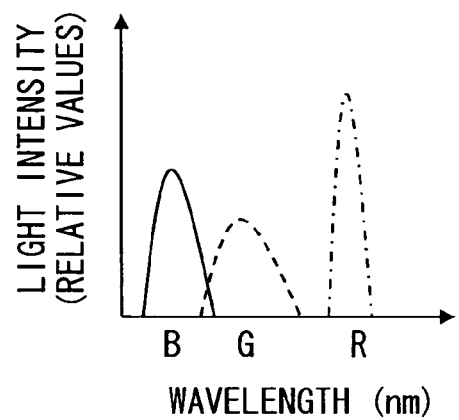
FIG. 13B is a graph showing the relationship between the wavelength and intensity of the light emitted from the above light source.

For example, suppose that, as shown in FIG. 13A, the optical element 24 is so fabricated that the diffraction efficiency at the diffraction peak wavelengths ($R_1$, $G_1$, and $B_1$) for three, namely R, G, and B, colors is approximately equal, and that this optical element 24 is illuminated by the light source 12 shown in FIG. 12. The intensity distribution of the light source 12 is, for example, as shown in FIG. 13B, and the light from the light-emitting chips 12R, 12G, and 12C is individually diffracted by the corresponding R, G, and B holograms to produce image light.

In general, in a light source having separate R, G, and B light-emitting chips, the upper limit of the current that can be passed through each light-emitting chip (that is, the rated current) is prescribed. However, in a case where a one-chip light source like the light source 12 shown in FIG. 12 having a plurality of light-emitting chips 12R, 12G, and 12B mounted in a single package is used and current is passed through them simultaneously, for appropriate dissipation of the heat generated by the light-emitting chips 12R, 12G, and 12B when they emit light, it is impossible to feed all the light-emitting chips 12R, 12G, and 12B simultaneously with the rated upper limit current; that is, an upper limit is set on the sum of the power consumption by the individual light-emitting chips 12R, 12G, and 12B.

Thus, in actual use, the current that is simultaneously passed through the light-emitting chips 12R, 12G, and 12B needs to be so suppressed that the sum of the power consumption by the light-emitting chips 12R, 12G, and 12B does not exceed the upper limit. Since the larger the current that is passed through the light-emitting chips 12R, 12G, and 12B, the brighter the image obtained, to pass as much current as possible within the limited power consumption, it is advisable to pass more current through a light-emitting chip that consumes less electric power when fed with a given amount of current.

Figure 13C:
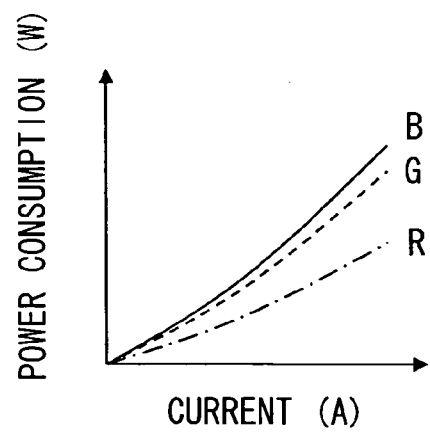
FIG. 13C is a graph showing the relationship between the current fed to and the power consumed by each light-emitting chip of the above light source.
Figure 13D:
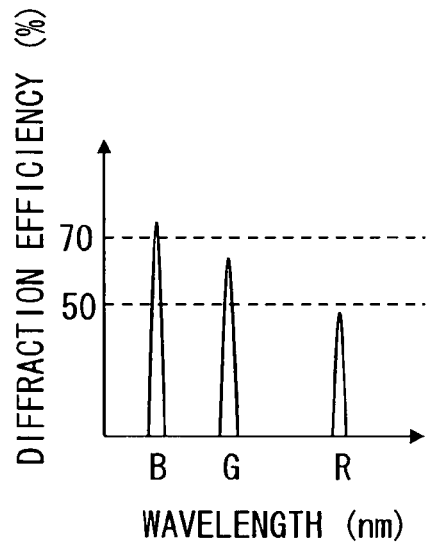
FIG. 13D is a graph showing an example of the diffraction efficiency at different wavelengths in an optical element whose diffraction efficiency has been set with consideration given to the power consumption of the above light source.

Accordingly, in this embodiment, as shown in FIG. 13C, in a case where the electric power consumed by the light-emitting chips 12R, 12G, and 12B when fed with a given amount of current is increasingly low with 12B, 12G, and 12R in this order, then, as shown in FIG. 13D, the exposure amounts of RGB laser light from the fabrication light source (the light source 31, see FIG. 7) to which the hologram photosensitive material 24a is exposed are adjusted, by the shutters 33, in such a way that the diffraction efficiency at the diffraction peak wavelength $R_1$ corresponding to the light-emitting chip 12R that consumes the least electric power is lower than the diffraction efficiency at the other diffraction peak wavelengths $G_1$ and $B_1$, and the hologram photosensitive material 24a is exposed with the thus adjusted exposure amounts to produce the optical element 24.

By fabricating the optical element 24 in this way, it is possible to increase the amount of current passed through the light-emitting chip 12R within the prescribed overall power consumption and thereby increase the amount light emitted therefrom. Thus, it is possible to obtain bright light while saving power as much as possible. On the other hand, the diffraction efficiency at the diffraction peak wavelengths $G_1$ and $B_1$ is set to be higher than at the diffraction peak wavelength $R_1$, and thus, even when the amounts of current passed through the light-emitting chips 12G and 12B are decreased, the amounts of G and B light ultimately obtained do not lower. Thus, it is possible to reduce the power consumption by the light source 12 without lowering the amounts of RGB light obtained ultimately.

In addition, when the amounts of current simultaneously passed through the individual light-emitting chips 12R, 12G, and 12B are adjusted, it is possible to adjust those amounts of current and thereby adjust the R, G, and B light intensity so that, for example, the reproduction light is white. Thus, by so doing, it is possible to obtain, with every light source 12 used, a bright image with a good color balance.

That is, by fabricating the optical element 24 in consideration of the power consumption of the light source 12, it is possible to obtain a bright image with a good color balance and in addition to achieve power saving in the light source 12.

In particular, when the exposure amounts of laser light of the different wavelengths from the fabrication light source (the light source 31) are so adjusted that the diffraction efficiency at the individual diffraction peak wavelengths ($R_1, G_1$, and $B_1$) in the optical element 24 is such that the reproduction light obtained from the light source 12 via the optical element 24 is white, it is possible to securely obtain a color balance with a good color balance via the optical element 24.

As described above, from the perspectives of image brightness and efficient use of the light of the light source 12, it is advisable to fabricate the optical element 24 so that, as shown in FIG. 13D, the maximum diffraction efficiency value among those at the individual diffraction peak wavelengths ($R_1, G_1$, and $B_1$) is 70% or more.

Needless to say, even when the optical element 24 is fabricated with the diffraction efficiency thereof set in consideration of the power consumption of the light source 12, it is possible to apply what has previously been explained in the present specification, such as the method of exposing the hologram photosensitive material 24a.

9. LCD

Figure 14A:
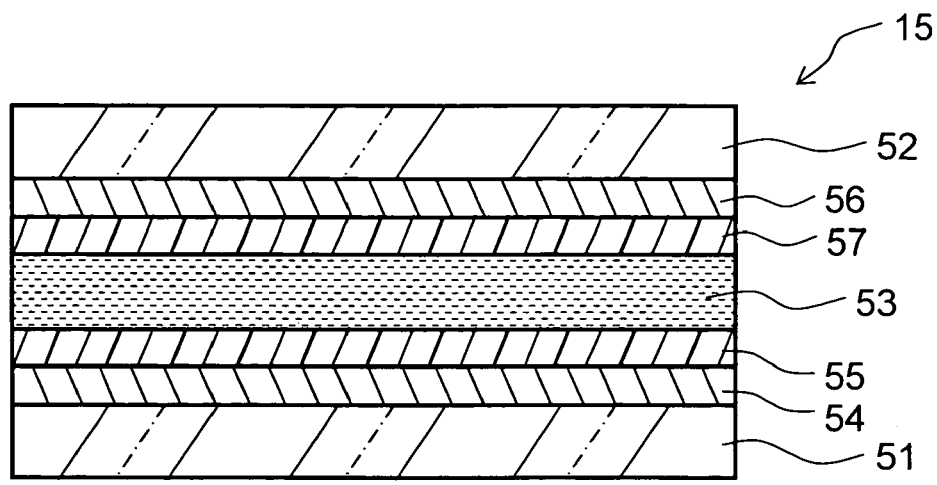
FIG. 14A is a sectional view showing an example of the structure of the LCD used in the above image display apparatus.
Figure 14B:
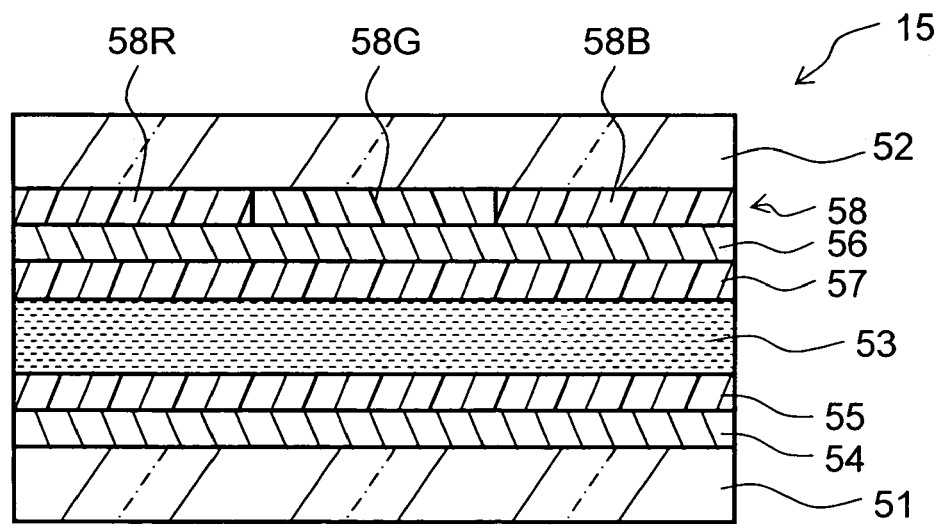
FIG. 14B is a sectional view showing another example of the structure of the LCD used in the above image display apparatus

Next, the LCD 15 used in this embodiment will be described in detail. FIGS. 14A and 14B show examples of the structure of the LCD 15, FIG. 14A being a sectional view showing the structure of one pixel of an LCD 15 that is driven by a field-sequential method, and FIG. 14B being a sectional view showing the structure of one pixel of an LCD 15 that has a color filter. In this embodiment, an LCD 15 of either of the types shown in FIGS. 14A and 14B can be used.

First, the LCD 15 shown in FIG. 14A will be described. The LCD 15 shown in FIG. 14A is a light modulation element that modulates the light emitted from the light source 12 according to an image signal, and is composed of a pair of transparent substrates 51 and 52 having a liquid crystal layer 53 held therebetween. On one transparent substrate 51, on the liquid crystal layer 53 side surface thereof, a transparent electrode (pixel electrode) 54 and an alignment film 55 are laid in this order; on the other transparent substrate 52, on the liquid crystal layer 53 side surface thereof, a common electrode 56 and an alignment film 57 are laid in this order. That is, the LCD 15 shown in FIG. 14A has no color filter. Although not illustrated, a TFT (thin-film transistor) is formed in each pixel, with the gate electrode of the TFT connected to a scanning line, the source electrode of the TFT connected to a signal line, and the drain electrode of the TFT connected to the transparent electrode 54.

When the LCD 15 shown in FIG. 14A is used, it is possible to use, as the light source 12, one that makes light-emitting chips of different light emission wavelengths (RGB) emit light sequentially on a time-division basis. Such a light source 12 may be of a one-chip type that has R, G, and B light-emitting chips mounted on a common substrate as shown in FIG. 12, or of a type that has R, G, and B light-emitting chips mounted independently on separate substrates.

In the LCD 15 shown in FIG. 14A, its pixels are driven on a time-division basis. That is, transmission of light through the individual pixels is controlled on a time-division basis according to R, G, and B image data, and thus, as a result of R, G, and B light being fed sequentially on a time-divisional basis from the light source 12 to the LCD 15, the LCD 15 displays R, G, and B images on a time-divisional basis. Thus, when the R, G, and B image light from the LCD 15 is directed via the optical element 24 to the optical pupil E, the observer can observe a color image.

An LCD 15 of a field-sequential type has no color filter that produces a loss of light, and thus using it makes it possible to increase the efficiency with which the light emitted from the light source 12 as the reproduction light source is used, and thus makes it possible to obtain a bright image. Moreover, when such an LCD 15 is used, in the light source 12, the R, G, and B illumination light sources (light-emitting chips) do not emit light simultaneously, and this makes it possible to feed each of the illumination light sources with the amount of current equal to the upper limit of their rated current. Thus, also from this perspective, it is possible to obtain a bright image by making the most of the light emitted from the light source 12 used.

Next, the LCD 15 shown in FIG. 14B will be described. The LCD 15 shown in FIG. 14B, as compared with the LCD 15 shown in FIG. 14A, is further provided with a color filter 58. The color filter 58 is composed of R, G, and B filters 58R, 58G, and 58B, and is formed on the liquid crystal layer 53 side surface of the transparent substrate 52. The common electrode 56 and the alignment film 57 are laid in this order on top of the color filter 58. In FIG. 14B, the color filters 58R, 58G, and 58B are formed three of them, i.e., one of each type, in each pixel, but may instead be formed one, i.e., only one of one type, in each pixel.

When the LCD 15 shown in FIG. 14B is used, it is possible to use, as the light source 12, one that makes light-emitting chips of different wavelengths (R, G, and B) emit light simultaneously. Such a light source 12 may be of a one-chip type that has R, G, and B light-emitting chips mounted on a common substrate as shown in FIG. 12, or of a type that has R, G, and B light-emitting chips mounted independently on separate substrates, or of a type that emits white light.

In the LCD 15 shown in FIG. 15B, its pixels are driven simultaneously according to R, G, and B image data, and thus, as a result of R, G, and B light (or white light) being fed simultaneously from the light source 12 to the LCD 15, the LCD 15 displays a color image. Thus, when the image light from the LCD 15 is directed via the optical element 24 to the optical pupil E, the observer can observe a color image.

When the LCD 15 shown in FIG. 14B is used, it is also possible to use, as the light source 12, one that emits R, G, and B light sequentially on a time-divisional basis. In that case, as when the field-sequential method is used, it is possible to feed each of the R, G, and B illumination light sources (light-emitting chips) of the light source 12 with the amount of current equal to the upper limit of their rated current, and thus it is possible to obtain a bright image.

As described above, when an LCD 15 of a color filter type is used, it is possible to use, as the light source 12, both one that emits R, G, and B light simultaneously and one that emits R, G, and B light sequentially on a time-division basis; that is, it is possible to cope with either of those types.

In particular, when, as the light source 12, one having R, G, and B light-emitting chips mounted in a single package is used, for appropriate dissipation of the heat generated by those light-emitting chips when they simultaneously emit light, an upper limit is set on the sum of the electric power consumed by the individual light-emitting chips. Thus, when the hologram is fabricated with its diffraction efficiency at the individual diffraction peak wavelengths set in consideration of the power consumption of the corresponding light-emitting chips, it is possible to obtain as bright an image as possible with a good color balance while saving power. Thus, even when an LCD 15 having a color filter is used as a light modulation element, it is possible to realize a HMD that offers satisfactory performance.

In this embodiment, the eyepiece optical system 21 has been described as having the optical element 24 held between the transparent base members 22 and 23. Needless to say, this structure of this embodiment can be applied also in a case where the optical device is built simply by bonding the optical element 24 on the transparent base member 22. In that case, there is no need to use adhesive as used in this embodiment to bond the transparent base members 22 and 23 together, and thus it is possible to prevent the optical element 24 from being adversely affected by adhesive.

In this embodiment, the joint surfaces of the transparent base members 22 and 23 have been described as being flat. Those joint surfaces, however, may instead be, for example, curved.

In this embodiment, the image display apparatus 1 has been described as being applied to a HMD. The image display apparatus 1, however, may instead be applied to, for example, a head-up display.

In this embodiment, the transparent base members 22 and 23 have been described as being flat. The transparent base members 22 and 23, however, may instead have a curvature. In that case, the eyepiece optical system 21 also functions as an eyeglass lens that corrects eyesight.

As will be understood from what has been described thus far, according to the present invention, a method for producing an optical device involves exposing a hologram photosensitive material bonded on a transparent base member to laser light of a plurality of different wavelengths from a fabrication light source to form on the transparent base member a hologram optical element having a plurality of diffraction peak wavelengths (having diffraction peaks in a plurality of wavelength bands) corresponding to the different wavelengths. Here, the exposure amounts of laser light of the different wavelengths from the fabrication light source are adjusted in such a way that, during reproduction, the diffraction efficiency at the individual diffraction peak wavelengths in the optical element is commensurate with the light intensity at the individual diffraction peak wavelengths in the light emitted from a reproduction light source.

Correspondingly, according to the present invention, an optical device has, as a result of a hologram photosensitive material bonded on a transparent base member being exposed to laser light of a plurality of different wavelengths from a fabrication light source, a hologram optical element formed on the transparent base member so as to have a plurality of diffraction peak wavelengths corresponding to the different wavelengths. Here, the exposure amounts of laser light of the different wavelengths from the fabrication light source are adjusted in such a way that, during reproduction, the diffraction efficiency at the individual diffraction peak wavelengths in the optical element is commensurate with the light intensity at the individual diffraction peak wavelengths in the light emitted from a reproduction light source, and the optical element is formed by exposing the hologram photosensitive material to the so adjusted exposure amounts of laser light.

As described above, the optical element is formed on the transparent base member with consideration given to the light intensity at the individual diffraction peak wavelengths of the light emitted from the reproduction light source used and with the exposure amounts of laser light adjusted, for each of the wavelengths, so that diffraction efficiency commensurate with the light intensity is obtained. This makes it possible to adjust the hue of the light (reproduction light) obtained from the reproduction light source via the optical element to the hue desired with every reproduction light source used while making the most of the light emitted from the reproduction light source used. In this way, it is possible to obtain, with every reproduction light source used, a bright image with a good color balance.

Alternatively, according to the present invention, a method for producing an optical device involves exposing a hologram photosensitive material bonded on a transparent base member to laser light of a plurality of different wavelengths from a fabrication light source to form on the transparent base member a hologram optical element having a plurality of diffraction peak wavelengths (having diffraction peaks in a plurality of wavelength bands) corresponding to the different wavelengths. Here, the exposure amounts of laser light of the different wavelengths from the fabrication light source are adjusted in such a way that, during reproduction, when a plurality of illumination light sources corresponding to the individual diffraction peak wavelengths are used as the reproduction light source and the diffraction efficiency at the diffraction peak wavelength corresponding to, of the plurality of illumination light sources, the one that consumes the least electric power when fed with a given amount of current is lower than the diffraction efficiency at the other diffraction peak wavelengths.

Correspondingly, according to the present invention, an optical device has, as a result of a hologram photosensitive material bonded on a transparent base member being exposed to laser light of a plurality of different wavelengths from a fabrication light source, a hologram optical element formed on the transparent base member so as to have a plurality of diffraction peak wavelengths corresponding to the different wavelengths. Here, the exposure amounts of laser light of the different wavelengths from the fabrication light source are adjusted in such a way that, during reproduction, when a plurality of illumination light sources corresponding to the individual diffraction peak wavelengths are used as the reproduction light source and the diffraction efficiency at the diffraction peak wavelength corresponding to, of the plurality of illumination light sources, the one that consumes the least electric power when fed with a given amount of current is lower than the diffraction efficiency at the other diffraction peak wavelengths, and the optical element is formed by exposing the hologram photosensitive material to the so adjusted exposure amounts of laser light.

As described above, the diffraction efficiency at the diffraction peak wavelength corresponding to the illumination light source that consumes the least electric power is set to be lower than the diffraction efficiency at the other diffraction peak wavelengths. Thus, it is possible to increase the amount of current passed through that illumination light source and thereby increase the amount of light emitted therefrom within the range of the prescribed overall power consumption. That is, it is possible to obtain bright light while saving power as much as possible. In addition, when the amounts of current passed through the individual illumination light sources are adjusted, by adjusting the amounts of current and thereby adjusting the R, G, and B light intensity so that the reproduction light is, for example, white, it is possible to obtain a bright image with a good color balance with every reproduction light source used. Thus, according to the present invention, it is possible not simply to obtain, with every reproduction light source used, a bright image with a good color balance but simultaneously to achieve power saving in the reproduction light source.

In the method for producing an optical device according to the present invention, it is preferable that the exposure amounts of laser light of the different wavelengths from the fabrication light source be adjusted in such a way that the diffraction efficiency at the individual diffraction peak wavelengths in the optical element is such that the reproduction light obtained from the reproduction light source via the optical element is white.

Correspondingly, in the optical device according to the present invention, it is preferable that the diffraction efficiency at the individual diffraction peak wavelengths in the optical element be set to be such that the reproduction light obtained from the reproduction light source via the optical element is white.

With this design, the light of the different wavelengths fed from the reproduction light source to the optical element is diffracted by the optical element in such a way that the reproduction light is white. Thus, via the optical element, it is possible to securely obtain a color image with a good color balance.

In the method for producing an optical device according to the present invention, it is preferable that the exposure amounts of laser light of the different wavelengths from the fabrication light source be adjusted in such a way that the diffraction efficiency at the individual diffraction peak wavelengths in the optical element is such that, when the optical element is fed with light obtained by making the reproduction light source emit light at light intensity corresponding to 70% or more of the amount of light that it is rated to emit, the reproduction light emitted from the optical element is white.

Correspondingly, in the optical device according to the present invention, the diffraction efficiency at the individual diffraction peak wavelengths in the optical element is such that, when the optical element is fed with light obtained by making the reproduction light source emit light at light intensity corresponding to 70% or more of the amount of light that it is rated to emit, the reproduction light emitted from the optical element is white.

With this design, the light intensity of the light emitted from the reproduction light source is 70% or more of the amount of light that it is rated to emit, and, when this amount of light is fed to the optical element, the light of the different wavelengths is diffracted by the optical element in such a way that the reproduction light emanating from the optical element is white. Thus, via the optical element, it is possible to obtain a bright color image with a good color balance.

In the method for producing an optical device and in the optical device according to the present invention, it is preferable that the reproduction light be white within the range defined as $(X, Y)=(0.32\pm0.05, 0.33\pm0.05)$ when expressed in XY chromaticity coordinates in the XYZ color system. With this design, the reproduction light can be perceived as substantially white by the observer who sees it.

In the method for producing an optical device according to the present invention, it is preferable to use, as the reproduction light source, a light-emitting diode (LED). Correspondingly, in the optical device according to the present invention, it is preferable that the reproduction light source be a light-emitting diode. With this design, it is easy to make the reproduction light source emit, for example, red (R), green (G), and blue (B) light independently. This makes it easy to produce the optical device in consideration of the light intensity at the individual diffraction peak wavelengths.

In the method for producing an optical device and in the optical device according to the present invention, it is preferable that the light-emitting diode be one that emits light of three colors, namely red (R), green (G), and blue (B). The light-emitting diode may be of a type that emits R, G, and B light with a single chip, or of a type that emits R, G, and B light independently with separate chips. By using a light-emitting diode that emits light of three, namely R, G, and B colors in this way, it is possible to achieve good color reproduction in the color image obtained via the optical element. It is also possible to achieve good matching with the hologram photosensitive material.

In particular, in a case where the light-emitting diode is one having a plurality of light-emitting chips of different light emission wavelengths mounted in a single package, the present invention offers greater advantages. The plurality of light-emitting chips may be those that emit RGB light, or those that emit light of other wavelengths. In a case where a plurality of light-emitting chips are mounted in a single package, for appropriate dissipation of the heat generated by those light-emitting chips when they emit light simultaneously, an upper limit is set on the sum of the electric power consumed by the individual light-emitting chips. Thus, by fabricating holograms with the diffraction efficiency at the corresponding diffraction peak wavelengths set in consideration of the power consumption of the individual light-emitting chips as described above, it is possible to obtain an image with maximum brightness and a good color balance while saving power.

In the method for producing an optical device according to the present invention, it is preferable that the laser light of the different wavelengths from the fabrication light source be adjusted in such a way that the ratio of the intensity of the laser light from the fabrication light source among the different wavelengths is approximately constant at any position on the exposure surface of the hologram photosensitive material.

Correspondingly, in the optical device according to the present invention, it is preferable that the laser light of the different wavelengths from the fabrication light source be adjusted in such a way that the ratio of the intensity of the laser light from the fabrication light source among the different wavelengths is approximately constant at any position on the exposure surface of the hologram photosensitive material, and that the optical element be formed by exposing the hologram photosensitive material to the so adjusted laser light.

With this design, the ratio of diffraction efficiency among the different wavelengths is approximately constant at any position on the surface of the optical element corresponding to the exposure surface of the hologram photosensitive material. Thus, it is possible to alleviate overall color unevenness in the color image obtained via the optical element.

In the method for producing an optical device according to the present invention, it is preferable that the laser light of the plurality of wavelengths from the fabrication light source be red, green, and blue light, and that the red, green, and blue laser light be adjusted in such a way that, let the intensity of the red, green, and blue laser light shone at a first position on the exposure surface of the hologram photosensitive material be R1, G1, and B1, respectively, and let the intensity of the red, green, and blue laser light shone at a second position different from the first position on the exposure surface of the hologram photosensitive material be R2, G2, and B2, respectively, then, at any two positions on the exposure surface selected as the first and second positions, the following formulae holds:

$$|(R1/G1)-(R2/G2)|\leq 0.3\times(R1/G1), \text{ and}$$

$$|(B1/G1)-(B2/G2)|\leq 0.3\times(B1/G1)$$

Correspondingly, in the optical device according to the present invention, it is preferable that the laser light of the plurality of wavelengths from the fabrication light source be red, green, and blue light, and that the optical device is formed by exposing the hologram photosensitive material to the red, green, and blue laser light so adjusted that, let the intensity of the red, green, and blue laser light shone at a first position on the exposure surface of the hologram photosensitive material be R1, G1, and B1, respectively, and let the intensity of the red, green, and blue laser light shone at a second position different from the first position on the exposure surface of the hologram photosensitive material be R2, G2, and B2, respectively, then, at any two positions on the exposure surface selected as the first and second positions, the following formulae holds:

$$|(R1/G1)-(R2/G2)| \leq 0.3 \times (R1/G1), \text{ and}$$

$$|(B1/G1)-(B2/G2)| \leq 0.3 \times (B1/G1)$$

With this design, the differences in diffraction efficiency among the different wavelengths can be suppressed to about 20% or less at any position on the surface of the optical element corresponding to the exposure surface of the hologram photosensitive material. This makes it possible to reduce the overall color unevenness in the color image obtained via the optical element to a practically negligible level.

In the method for producing an optical device according to the present invention, it is preferable that the laser light of the different wavelengths be adjusted in such a way that the deviations among the positions on the exposure surface of the hologram photosensitive material at which the laser light of the different wavelengths from the fabrication light source has maximum intensity is one half or less of the length of the exposure surface in the major-axis direction thereof.

Correspondingly, in the optical device according to the present invention, it is preferable that the laser light of the different wavelengths be adjusted in such a way that the deviations among the positions on the exposure surface of the hologram photosensitive material at which the laser light of the different wavelengths from the fabrication light source has maximum intensity is one half or less of the length of the exposure surface in the major-axis direction thereof, and that the optical element be formed by exposing the hologram photosensitive material to the so adjusted laser light.

With this design, it is possible to easily and efficiently suppress the differences in diffraction efficiency among the different wavelengths to about 20% or less at any position on the surface of the optical element corresponding to the exposure surface of the hologram photosensitive material. This makes it possible to easily and efficiently reduce the overall color unevenness in the color image obtained via the optical element to a practically negligible level.

In the method for producing an optical device according to the present invention, it is preferable that the laser light of the different wavelengths be adjusted in such a way that the intensity of the laser light of the different wavelengths from the fabrication light source is, for each wavelength, approximately equal between at two points at both ends of the exposure surface of the hologram photosensitive material in the major-axis direction thereof.

Correspondingly, in the optical device according to the present invention, it is preferable that the laser light of the different wavelengths be adjusted in such a way that the intensity of the laser light of the different wavelengths from the fabrication light source is, for each wavelength, approximately equal between at two points at both ends of the exposure surface of the hologram photosensitive material in the major-axis direction thereof, and that the optical element be formed by exposing the hologram photosensitive material to the so adjusted laser light.

When the intensity of the laser light of the different wavelengths from the fabrication light source is, for each wavelength, approximately equal between at two points at both ends of the exposure surface of the hologram photosensitive material in the major-axis direction thereof, it can be judged in simplified terms that the differences in diffraction efficiency among the different wavelengths is within about 20%. This makes it possible to reduce, in simplified terms, the overall color unevenness in the color image obtained via the optical element to a practically negligible level.

In the method for producing an optical device according to the present invention, it is preferable that the laser light of the different wavelengths be adjusted in such a way that the differences in absolute intensity between at the positions on the exposure surface of the hologram photosensitive material at which the laser light of the different wavelengths from the fabrication light source has maximum absolute intensity and at the positions on the exposure surface of the hologram photosensitive material at which the laser light of the different wavelengths from the fabrication light source has minimum absolute intensity are, for all the different wavelengths, 50% or less of the respective maximum absolute intensity.

Correspondingly, in the optical device according to the present invention, it is preferable that the laser light of the different wavelengths be adjusted in such a way that the differences in absolute intensity between at the positions on the exposure surface of the hologram photosensitive material at which the laser light of the different wavelengths from the fabrication light source has maximum absolute intensity and at the positions on the exposure surface of the hologram photosensitive material at which the laser light of the different wavelengths from the fabrication light source has minimum absolute intensity are, for all the different wavelengths, 50% or less of the respective maximum absolute intensity, and that the optical element be formed by exposing the hologram photosensitive material to the so adjusted laser light.

If, for the different wavelengths, differences in the absolute intensity of the laser light are too large between at two arbitrary points on the surface of the optical element corresponding to the exposure surface of the hologram photosensitive material, the differences are recognized by the observer as a difference in brightness in the color image obtained via the optical element. When the laser light is so adjusted that the maximum differences in the absolute intensity of the laser light on the exposure surface are, for all the different wavelengths, 50% or less of their respective maximum absolute intensity as described above, it is possible to reduce differences in brightness in the color image. In this way, it is possible to alleviate brightness unevenness in the color image.

According to the present invention, an image display apparatus is provided with the above-described optical device according to the present invention and an image display element that displays an image to feed it to the optical device. With this design, the observer can simultaneously observe, via the optical device, the image fed from the image display element and, also via the optical device but here on a see-through basis, the outside-world image.

In the image display apparatus according to the present invention, it is preferable that the image display element be provided with a reproduction light source that emits light and a light modulation element that modulates the light emitted from the reproduction light source according to an image signal. As a result of the light emitted from the reproduction light source being modulated by the light modulation element, the light modulation element displays an image.

Here, it is preferable that the reproduction light source be a light-emitting diode. With this design, it is possible to make it emit, for example, red (R), green, (G), and blue (B) light independently. Thus, it is possible to use, as the light modulation element, for example an LCD that is driven by a field-sequential method, or an LCD that has a color filter; that is, it is possible to cope with either of the two types.

Moreover, it is preferable that the light-emitting diode be one that emits light of three colors, namely red, green, and blue. By using a light-emitting diode that emits light of three, namely R, G, and B, colors, it is possible to achieve good color reproduction in the color image obtained via the optical element.

It is particularly preferable that the light-emitting diode be of a type that has a plurality of light-emitting chips of different light emission wavelengths mounted in a single package. The plurality of light-emitting chips may be those which emit R, G, and B light, or those which emit light of other wavelengths. In a case where a one-chip type is used that has a plurality of light-emitting chips mounted in a single package, for appropriate dissipation of the heat generated by those light-emitting chips when they emit light simultaneously, an upper limit is set on the sum of the electric power consumed by the individual light-emitting chips. Thus, when this type of light-emitting diode is used, by fabricating holograms with the diffraction efficiency at the corresponding diffraction peak wavelengths set in consideration of the power consumption of the individual light-emitting chips, it is possible to obtain an image with maximum brightness and a good color balance while saving power. This makes it possible to realize an image display apparatus that offers satisfactory performance.

The light modulation element may be of a type that is driven by a field-sequential method. Since the light modulation element then has no color filter that produces a loss of light, it is possible to increase the efficiency with which the light emitted from the reproduction light source is used, and thus it is possible to obtain a bright image.

The light modulation element may be of a type that has a color filter. With this design, it is possible to use, as the reproduction light source, one that emits R, G, and B light sequentially on a time-division basis, or one that emits R, G, and B light simultaneously; thus, it is possible to cope with either of the two types.

In the image display apparatus according to the present invention, the reproduction light source may be so designed as to make light-emitting chips of different light emission wavelengths emit light sequentially on a time-division basis. With this design, in the reproduction light source, the illumination light sources of the different wavelengths do not emit light simultaneously, and this makes it possible to feed each of the illumination light sources of the different wavelengths with the amount of current equal to the upper limit of its rated current. Thus, it is possible to obtain a bright image while making the most of the light emitted from the reproduction light source used.

Alternatively, in the image display apparatus according to the present invention, the reproduction light source may be so designed as to make light-emitting chips of different light emission wavelengths emit light simultaneously. For example, when a one-chip type is used that has a plurality of light-emitting chips mounted in a single package, for appropriate dissipation of the heat generated by those light-emitting chips when they emit light simultaneously, an upper limit is set on the sum of the electric power consumed by the individual light-emitting chips. Thus, by fabricating holograms with the diffraction efficiency at the corresponding diffraction peak wavelengths set in consideration of the power consumption of the individual light-emitting chips, it is possible to obtain an image with maximum brightness and a good color balance while saving power. Thus, even when the light modulation element is of a type that has a color filter, it is possible to realize an image display apparatus that offers satisfactory performance.

In the image display apparatus according to the present invention, it is preferable that the optical element of the optical device be a volume-phase-type reflective hologram. With this design, when the image light fed from the image display element is reflected on the hologram toward the observer, the observer can observe a virtual image. In addition, since the volume-phase-type reflective hologram exhibits high transmittance to the light of the outside-world image, the observer can observe the outside-world image clearly.

The optical element of the optical device may be a combiner that directs the image fed from the image display element and the outside-world image simultaneously to the observer's eye. With this design, the observer can observe, via the optical element, the image fed from the image display element and the outside-world image simultaneously.

The optical device may form an eyepiece optical system that directs an enlarged virtual image of the image displayed on the image display element to the observer's eye. With this design, the observer can sufficiently clearly observe, as a virtual image, the image displayed on the image display element. Moreover, since the eyepiece optical system directs an enlarged virtual image of the image displayed on the image display element to the observer, it is possible to make the optical device forming the eyepiece optical system compact and lightweight, and hence to make the image display apparatus compact and lightweight.

It is preferable that the eyepiece optical system have a non-axisymmetric (positive) optical power. With this design, even when the eyepiece optical system is made compact, it is possible to permit the observer to observe an image with satisfactorily corrected aberrations.

It is preferable that the transparent base member of the optical device totally reflect, within itself, the light of the image fed from the image display element to direct it to the optical element. With this design, it is possible to make the most of the image light fed from the image display element, and thereby present the observer with a bright image. Moreover, it is also possible to arrange the image display element far away from the optical device, and thereby permits the observer to observe the outside world via a wide field of view.

It is preferable that the transmittance of the optical element of the optical device be 10% or more. With this design, the observer can observe the outside-world image sufficiently clearly via the optical element on a see-through basis.

According to the present invention, a head-mounted display is provided with the above-described image display apparatus and a supporter that supports the image display apparatus before the observer's eye. With this design, since the image display apparatus is supported before the observer's eye by the supporter, the observer can, with his or her hands free, observe the outside-world image and, as a virtual image, the image displayed by the image display element while doing handwork with his or her free hands. Moreover, the observation direction of the observer is fixed in one direction, and therefore the observer can easily find the displayed image even in a dark environment.

Obviously, many modifications and variations of the present invention are possible in light of the above teachings.

It is therefore to be understood that within the scope of the appended claims, the invention may be practiced other than as specifically described.

What is claimed is:

1. A method for producing an optical device, comprising:
   a bonding step of bonding a hologram photosensitive material on a transparent base member; and
   an exposing step of exposing the hologram photosensitive material to laser light of a plurality of different wavelengths from a fabrication light source in order to form on the transparent base member a hologram optical element having diffraction efficiency peaks at a plurality of diffraction peak wavelengths corresponding to the plurality of different wavelengths,
   wherein the exposing step includes a step of adjusting exposure amounts of laser light of the different wavelengths from the fabrication light source in such a way that diffraction efficiency of the hologram optical element at the individual diffraction peak wavelengths during reproduction is commensurate with light intensity at the individual diffraction peak wavelengths in light from a reproduction light source.

2. The method for producing an optical device according to claim 1,
   wherein the exposing step further includes a step of adjusting the exposure amounts of laser light of the different wavelengths from the fabrication light source in such a way that diffraction efficiency at the individual diffraction peak wavelengths in the optical element equals diffraction efficiency at which reproduction light obtained from the reproduction light source via the optical element is white.

3. The method for producing an optical device according to claim 2,
   wherein the reproduction light is white in a range defined as $(X, Y)=(0.32\pm0.05, 0.33\pm0.05)$ in terms of chromaticity coordinates in an XYZ color system.

4. The method for producing an optical device according to claim 1,
   wherein the exposing step further includes a step of adjusting the exposure amounts of laser light of the different wavelengths from the fabrication light source in such a way that diffraction efficiency at the individual diffraction peak wavelengths in the optical element equals diffraction efficiency at which reproduction light emergent from the optical element is white when the optical element is fed with light emitted from the reproduction light source so operated as to emit light at intensity of 70% or more of an amount of light that the reproduction light source is rated to emit.

5. The method for producing an optical device according to claim 4,
   wherein the reproduction light is white in a range defined as $(X, Y)=(0.32\pm0.05, 0.33\pm0.05)$ in terms of chromaticity coordinates in an XYZ color system.

6. The method for producing an optical device according to claim 1,
   wherein, as the reproduction light source, a light-emitting diode is used.

7. The method for producing an optical device according to claim 6,
   wherein the light-emitting diode emits light of three colors, namely red, green, and blue.

8. The method for producing an optical device according to claim 6,
   wherein the light-emitting diode has mounted in a single package a plurality of light-emitting chips each emitting light of a different wavelength.

9. The method for producing an optical device according to claim 1,
   wherein the exposing step further includes a step of adjusting the laser light of the different wavelengths in such a way that a ratio of intensity of the laser light of the different wavelengths from the fabrication light source is substantially constant over an entire exposure surface of the hologram photosensitive material.

10. The method for producing an optical device according to claim 1,
    wherein the laser light of the plurality different wavelengths from the fabrication light source is red, green, and blue laser light, and
    wherein the exposing step includes a step of adjusting the red, green, and blue laser light individually in such a way that,
       let intensity of the red, green, and blue laser light shone at a first position on an exposure surface of the hologram photosensitive material be R1, G1, and B1, respectively, and
       let intensity of the red, green, and blue laser light shone at a second position, different from the first position, on the exposure surface of the hologram photosensitive material be R2, G2, and B2, respectively,
    then relationships $|(R1/G1)-(R2/G2)|\leq 0.3\times(R1/G1)$, and $|(B1/G1)-(B2/G2)|\leq 0.3\times(B1/G1)$ hold with respect to any two positions selected as the first and second positions over the entire exposure surface of the hologram photosensitive material.

11. The method for producing an optical device according to claim 1,
    wherein the exposing step further includes a step of adjusting the laser light of the different wavelengths in such a way that deviations among positions on an exposure surface of the hologram photosensitive material at which the laser light of the different wavelengths from the fabrication light source has maximum intensity at the different wavelengths is ½ or less of a length of the exposure surface in a major-axis direction thereof.

12. The method for producing an optical device according to claim 1,
    wherein the exposing step further includes a step of adjusting the laser light of the different wavelengths in such a way that intensity of the laser light of the different wavelengths from the fabrication light source is, at each of the different wavelengths, substantially equal at two points at both ends of an exposure surface of the hologram photosensitive material in a major-axis direction thereof.

13. The method for producing an optical device according to claim 1,
    wherein the exposing step further includes a step of adjusting the laser light of the different wavelengths in such a way that differences in absolute light intensity between at positions on the exposing surface of the hologram photosensitive material at which the laser light of the different wavelengths from the fabrication light source has maximum absolute intensity and at positions on the exposing surface of the hologram photosensitive material at which the laser light of the different wavelengths from the fabrication light source has minimum absolute intensity are, for all the different wavelengths, 50% or less of the respective maximum absolute intensity at the different wavelengths.

14. A method for producing an optical device, comprising:

a bonding step of bonding a hologram photosensitive material on a transparent base member; and an exposing step of exposing the hologram photosensitive material to laser light of a plurality of different wavelengths from a fabrication light source in order to form on the transparent base member a hologram optical element having diffraction efficiency peaks at a plurality of diffraction peak wavelengths corresponding to the plurality of different wavelengths, wherein the exposing step includes a step of adjusting exposure amounts of laser light of the different wavelengths from the fabrication light source in such a way that, when a plurality of illumination light sources corresponding to the individual diffraction peak wavelengths are used as a reproduction light source during reproduction, diffraction efficiency at the diffraction peak wavelength corresponding to, of the plurality of illumination light sources, the illumination light source that consumes least electric power when fed with a given amount of current is lower than diffraction efficiency at the other diffraction peak wavelengths.

* * * * *